US008871085B2

(12) United States Patent
Davis

(10) Patent No.: US 8,871,085 B2
(45) Date of Patent: *Oct. 28, 2014

(54) METHOD AND APPARATUS FOR PROGRAMABLY TREATING WATER IN A WATER COOLER

(71) Applicant: S.I.P. Technologies L.L.C., New Orleans, LA (US)

(72) Inventor: Kenneth A. Davis, Mandeville, LA (US)

(73) Assignee: S.I.P. Technologies L.L.C., New Orleans, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,656

(22) Filed: Aug. 6, 2013

(65) Prior Publication Data

US 2014/0034561 A1 Feb. 6, 2014

Related U.S. Application Data

(63) Continuation of application No. 12/681,342, filed as application No. PCT/US2008/078601 on Oct. 2, 2008, now Pat. No. 8,500,993, which is a continuation-in-part of application No. 12/137,233, filed on Jun. 11, 2008, now Pat. No. 8,366,920.

(60) Provisional application No. 60/976,899, filed on Oct. 2, 2007.

(51) Int. Cl.
*C02F 1/78* (2006.01)
*C02F 1/50* (2006.01)
*B67D 3/00* (2006.01)
*C02F 1/00* (2006.01)

(52) U.S. Cl.
CPC ............... *C02F 1/50* (2013.01); *C02F 2209/44* (2013.01); *C02F 2209/42* (2013.01); *B67D 2210/0013* (2013.01); *B67D 2210/00023* (2013.01); *C02F 2303/04* (2013.01); *B67D 3/0038* (2013.01); *B67D 3/0032* (2013.01); *B67D 2210/00007* (2013.01); *C02F 1/78* (2013.01); *C02F 2201/782* (2013.01); *C02F 2201/784* (2013.01); *B67D 3/0009* (2013.01); *C02F 1/008* (2013.01); *Y10S 261/42* (2013.01)
USPC ............. 210/86; 210/104; 210/139; 210/141; 210/192; 210/205; 210/220; 261/122.1; 261/DIG. 42

(58) Field of Classification Search
CPC ............................... C02F 1/78; C02F 2201/78
USPC ........... 210/86, 103, 104, 139, 141, 192, 205, 210/220; 261/122.1, DIG. 42
See application file for complete search history.

(56) References Cited

U.S. PATENT DOCUMENTS

| 4,991,635 | A |  | 2/1991 | Ulm |  |
|---|---|---|---|---|---|
| 5,366,619 | A |  | 11/1994 | Matsui et al. |  |
| 5,683,576 | A |  | 11/1997 | Olsen |  |
| 5,768,049 | A | * | 6/1998 | Morehouse et al. | 360/97.21 |

(Continued)

*Primary Examiner* — Lucas Stelling
(74) *Attorney, Agent, or Firm* — Garvey, Smith, Nehrbass & North, L.L.C.; Charles C. Garvey, Jr.; Brett A. North

(57) ABSTRACT

An apparatus for a programmable self sanitizing water dispenser apparatus with a digital controller as well as a programmable method for generating ozone for cleaning the reservoir and the water contained within it. The apparatus includes an anti-spill receiver that houses the controller and that can contain a ozone generator.

8 Claims, 24 Drawing Sheets

(56) References Cited

U.S. PATENT DOCUMENTS

| | | |
|---|---|---|
| 6,561,382 B2 | 5/2003 | Shelton |
| 6,619,511 B2 | 9/2003 | Hydak et al. |
| 7,114,637 B2 | 10/2006 | Davis |
| 7,258,803 B2 | 8/2007 | Davis |
| 7,655,150 B2 | 2/2010 | Davis |
| 8,500,993 B2 | 8/2013 | Davis |
| 2005/0236432 A1 | 10/2005 | Davis |
| 2007/0272620 A1 | 11/2007 | Chaney |

* cited by examiner

US 8,871,085 B2

METHOD AND APPARATUS FOR PROGRAMABLY TREATING WATER IN A WATER COOLER

CROSS-REFERENCE TO RELATED APPLICATIONS

This is a continuation of U.S. patent application Ser. No. 12/681,342, filed 2 Aug. 2010 (which issued as U.S. Pat. No. 8,500,993 on 6 Aug. 2013), which is a 371 national stage 2 entry application of Patent Cooperation Treaty Application No. PCT/US2008/078601, filed on Oct. 2008 and published as WO2009/046201 on 9 Apr. 2009, which is a continuation in part of U.S. patent application Ser. No. 12/137,233, filed on 11 Jun. 2008 (which issued as U.S. Pat. No. 8,366,920 on 5 Feb. 2013), which is a nonprovisional of U.S. Provisional Patent Application Ser. No. 60/976,899, filed on 2 Oct. 2007, each of which is hereby incorporated herein by reference.

Priority of U.S. patent application Ser. No. 12/681,342, filed 2 Aug. 2010, U.S. patent application Ser. No. 12/137,233, filed 11 Jun. 2008, and U.S. Provisional Patent Application Ser. No. 60/976,899, filed 2 Oct. 2007, incorporated herein by reference, is hereby claimed.

U.S. Ser. No. 11/842,476, filed 21 Aug. 2007 which was a continuation of U.S. Ser. No. 11/535,754, filed 27 Sep. 2006 which was a continuation in part of Patent Cooperation Treaty Application No. PCT/US2005/014118, filed 21 Apr. 2005, published as WO2005/118462 on 15 Dec. 2005, are incorporated herein by reference.

Patent Cooperation Treaty Application No. PCT/US02/19158, international filing date 17 Jun. 2002, is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

FIELD OF THE INVENTION

The present invention relates to a method and apparatus for programmably treating water in a water dispenser or "water cooler" and more particularly to an improved method and apparatus for sanitizing water that is to be dispensed from a water dispenser or "water cooler" of the type having a cabinet with one or more spigots for dispensing water from a reservoir water supply that is contained within or hidden inside the cabinet.

GENERAL BACKGROUND

There are several types of cabinet type water dispensers in use today. One of the most common types of such water dispensers is a floor standing cabinet having an open top that receives a large inverted bottle. The bottle is typically of a plastic or glass material having a constricted neck. The bottle is turned upside down and placed on the top of the cabinet with the neck of the bottle extending into a water filled reservoir so that the water seeks its own level in the reservoir during use. As a user draws water from a spigot dispenser, the liquid level in the reservoir drops until it falls below the neck of the bottle at which time water flows from the bottle and bubbles enter the bottle until pressure has equalized. Inverted bottle type water dispensers are sold by a number of companies in the United States and elsewhere. Many such water dispensing cabinets are refrigerated.

Other types of water dispensers have an outer cabinet that contains a reservoir or water supply. These other types of water dispensers having a cabinet include one type that stores a large bottle (such as three or five gallon) at the bottom of the cabinet. A pump transfers water from the large bottle to the reservoir. At the reservoir, the water is typically refrigerated.

Another type of water dispenser simply connects a water supply (e.g., city water, well water) directly to a reservoir that is contained within or hidden inside the cabinet. A float valve or other water level controller can be provided to insure that the reservoir is always filled with water but does not overflow. Water that is transferred from city water, well water or another source can be filtered or otherwise treated before being transmitted to the reservoir.

All of these types of water dispensers that employ cabinets typically have one or more water dispensing spigots on the outside of the cabinet. These spigots are typically manually operated, but can be automatically operated. For example, water vending machines dispense after a consumer pays for water. The water is automatically dispensed when coins are fed to the machine.

One of the problems with cabinet style water dispensers is that of cleansing the reservoir from time to time. Because the reservoir is not air tight, it breathes allowing bacteria to enter the reservoir over a period of time. The reservoirs are typically contained within the confines of the cabinet and are not easily accessed and cleaned by consumers or end users.

For inverted bottle type dispensers, in addition to the problem of an open top, the five gallon bottles are themselves a source of bacteria and germs. Most of these bottles are transported on trucks where the bottles are exposed to outside air. They are handled by operators that typically grab the bottle at the neck, the very part of the bottle that communicates with the open reservoir during use. Unfortunately, it is difficult to convince every person that handles these bottles to wash their hands frequently enough. In order to properly sanitize such a water dispenser or cooler, the user must carefully clean the neck of the bottle prior to combining the bottle with the cabinet. Further, the user should drain and sanitize the reservoir from time to time. The cleansing of the reservoir in such a water dispenser is a time consuming project that is typically not performed at regular intervals.

The dispensing spigots that are provided on common cabinet type water dispensers can also be a source of contamination. These spigots are typically manually operated and are therefore a source of contamination from the users that operate them. Individuals have also been known to drink directly from the spigot. Therefore, sanitation of the spigots as well as the reservoir should be a part of routine maintenance.

Process ozone diffusion by bubble reactor method in small static volumes of water with abbreviated water columns to diffused ozone levels satisfactory to disinfect microorganisms in brief time periods can be difficult to achieve. An ozone generator can be used as the source of ozone. The ozone generator can include an air pump as a source of oxygen for generating ozone. The air pump preferably includes a microbial filter to filter contaminants. A diffuser can be used to diffuse the generated ozone into the water reservoir.

Various factors impact the effectiveness of bacterial removal from the water such as the microbial load, pH, temperature, conductivity, and cooler characteristics (e.g., whether an ice ring has formed which can act as a shield for microbes trapped in the ice ring). Furthermore, the variability of power supply (e.g., European power supplies versus US power supplies) can cause a generator's application to be geographically limited unless modified. Additionally, time constraints for operation of the ozone generator and diffuser can impact operation.

Additionally, in certain refrigerated reservoirs an ice ring can form inside the reservoir adjacent to the cooling coils for the reservoir. Such an ice ring can serve as a form of protection for microbes contained in the ice ring when ozone is being diffused in the reservoir. After an ozone cycle, when the ice melts wholly or partially, the trapped microbes can enter the water and thus contaminate the reservoir.

Additionally, certain waters contain loadings of bromates which can cause problems.

The above indicate a need for developing a generator and diffuser containing flexibility regarding the timing, amount, and duration of ozone generated; along with the timing, amount, and duration of air supplied. Additionally, there is a need for killing microbes which may be trapped in ice rings. Furthermore, there is a need for addressing water containing bromates. Additionally, there is a need for addressing different types of electrical supplies for various geographical areas.

In a preferred embodiment the method and apparatus is directed to an economical means of overcoming each of the factors that limit process ozone's potential disinfecting capacity. It is concerned with the optimization of each point in small automated ozonation systems both upstream and downstream from the ozonator. The object of this effort is to devise a single, economical, high longevity system capable of sanitizing many of the shapes and sizes of water dispensers in use today.

The present invention thus provides an improved self sanitizing water dispenser apparatus as well as a method for generating ozone for cleaning the reservoir and the water contained within it.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY OF THE PRESENT INVENTION

The drawings constitute a part of this specification and include exemplary embodiments to the invention, which may be embodied in various forms.

In a preferred embodiment the generator is programmable regarding the timing, amount, and/or duration of ozone generated and/or air supplied. In a preferred embodiment the generator is programmable regarding microbes which may be trapped in ice rings and/or water containing bromates. Furthermore in a preferred embodiment the generator can automatically adjust for different types of electrical supplies for various geographical areas.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PRESENT INVENTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
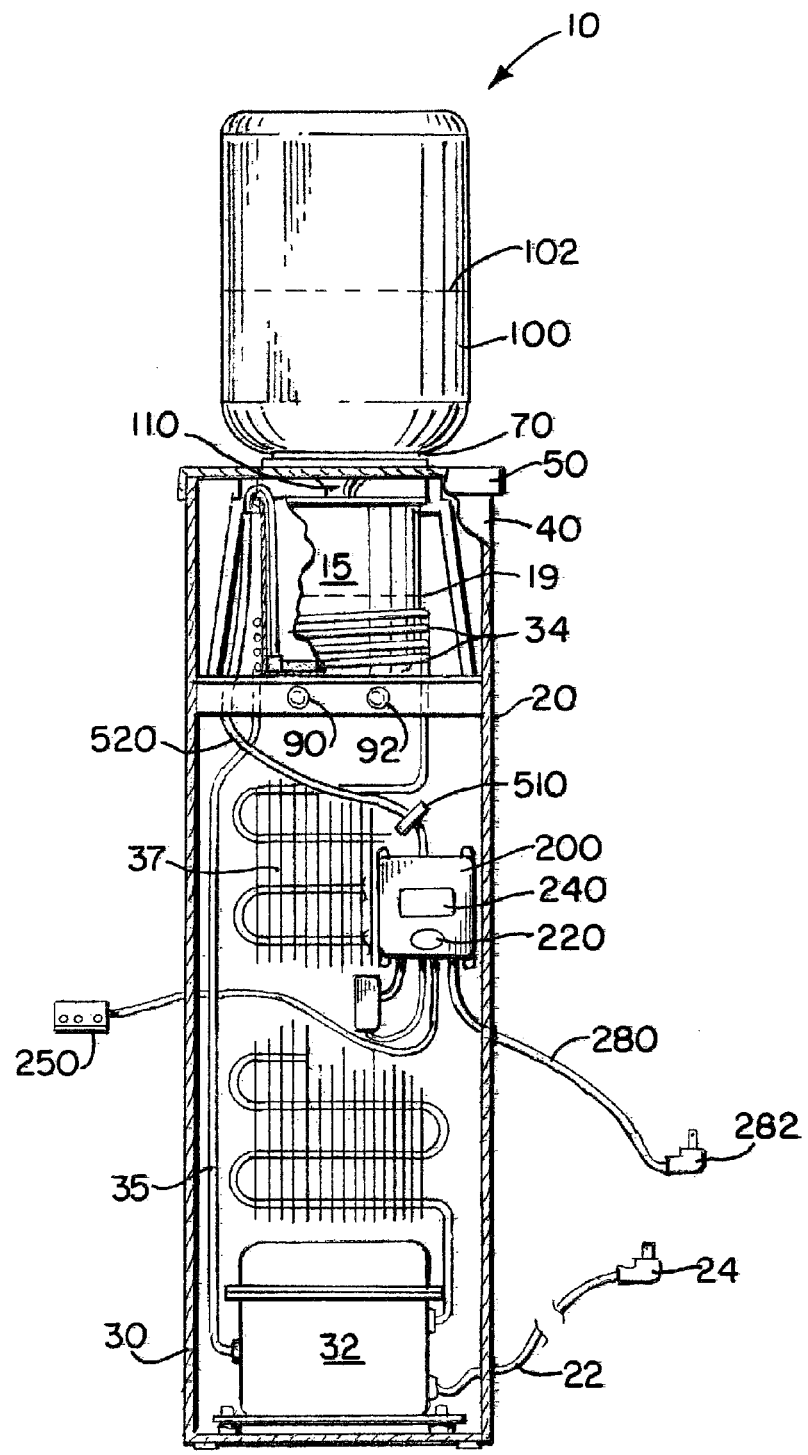
FIG. 1 is diagram of a water cooler incorporating one embodiment of a programmable controller.

FIG. 1 is diagram of a water dispenser or water cooler 10 incorporating one embodiment of a programmable controller 200. Water dispenser 10 provides an improved apparatus that sanitizes the open reservoir from time to time with ozone. The apparatus 10 includes a cabinet 20 having a lower end portion 30 and an upper end portion 40. The upper end portion 40 carries a cover 50 having an opening 60.

Opening 60 can provide an annular flange 70 and a gasket (e.g. o-ring) that define an interface between cabinet 20 and bottle 100. Bottle 100 can be any commercially available bottle, typically of a several gallon volume (e.g. five gallons). Bottle 100 can provide a constricted bottled neck 110 that is placed inside an open reservoir 15 during use. Bottle neck 110 has an opening for communicating with a reservoir 15 at the interior of cabinet 20 that holds the water product to be dispensed and consumed. When the water level 19A in reservoir 15 is lowered during use, air bubbles enter bottle 100 and water replenishes reservoir 15 until pressure equalizes.

Reservoir 15 has an interior 16 surrounded by reservoir sidewall 17 and reservoir bottom wall 18. Reservoir 15 can be, for example, generally cylindrically shaped and of a stainless steel or plastic material. Reservoir 15 can provide an open top for communicating with neck 110 of bottle 100.

During use, reservoir 15 has water level 19A that fluctuates slightly as water is dispensed and then replenished by bottle 100. One or more spigots 90,92 can be provided for withdrawing water contained in reservoir 15. For example, a left hand spigot 90 can be in communication with a flow line that extends up to and near the top of water in reservoir 15, thus removing ambient temperature water from reservoir 15 that is not in close proximity to the cooling coils 34 of cooling system which includes a compressor 32. Spigot 92 can provide a port for communicating with water contained in the lower end of reservoir 15. The refrigeration coils 34 could be positioned at the lower end of reservoir 15 so that spigot 92 withdraws cool water. As a practical matter, a water dispenser apparatus 10 could provide either ambient temperature water, cold water or heated water if, for example, a flow line 96 were to be provided with a heating element.

For cooling the water at the lower end portion of the reservoir 15, a cooling system that includes a compressor 32 can be provided. The refrigeration system includes flow lines 35, 36 in combination with compressor 32 to transmit cooling fluid to coils 34 and then to heat exchanger 37 as part of a system for cooling water in reservoir 15. Power can be provided by electrical lines, including an electrical line 22 provided with plug 24.

Water in reservoir 15 can be disinfected by ozone supplied by controller 200 operably connected to ozone generator 600.

Figure 2:
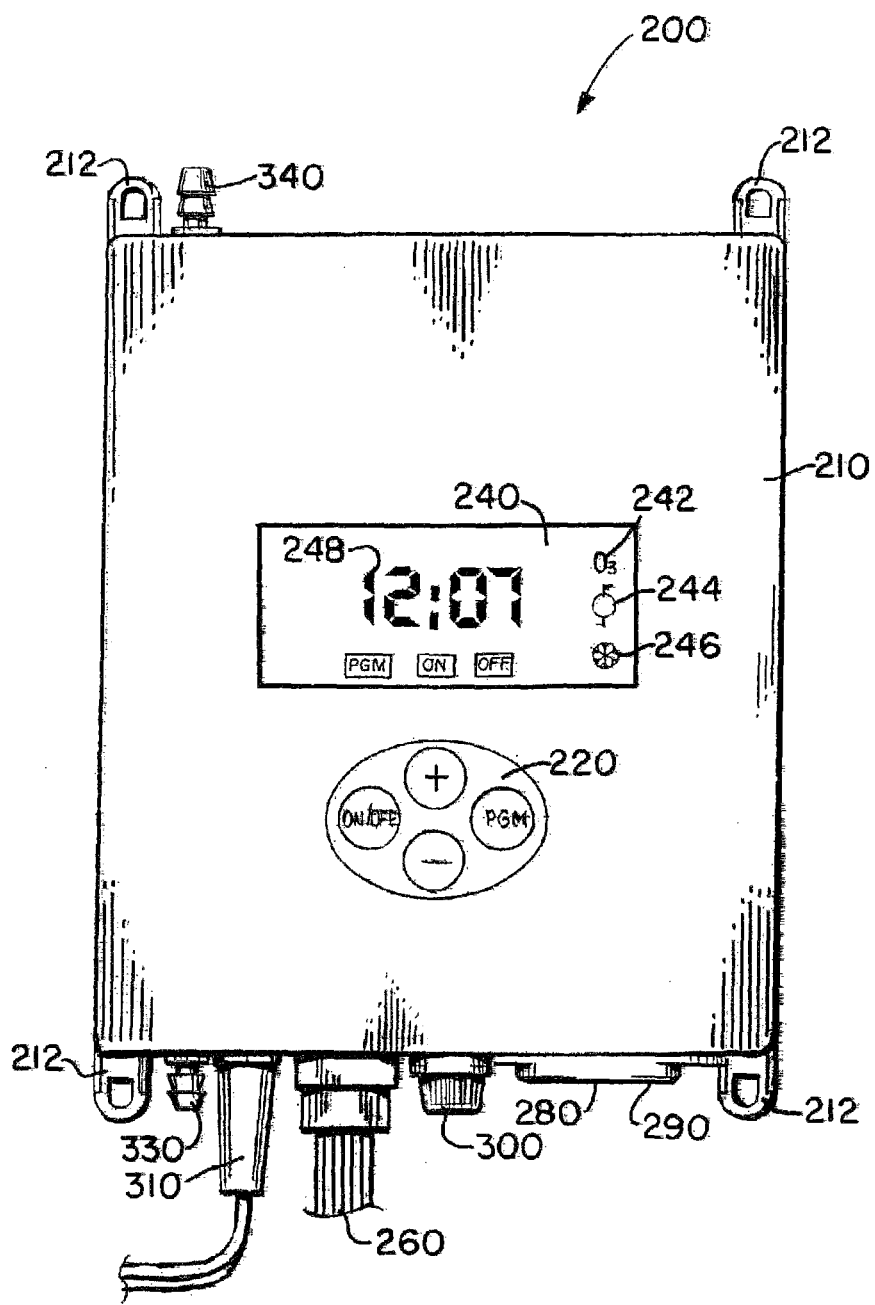
FIG. 2 is diagram of a programmable controller.
Figure 3:
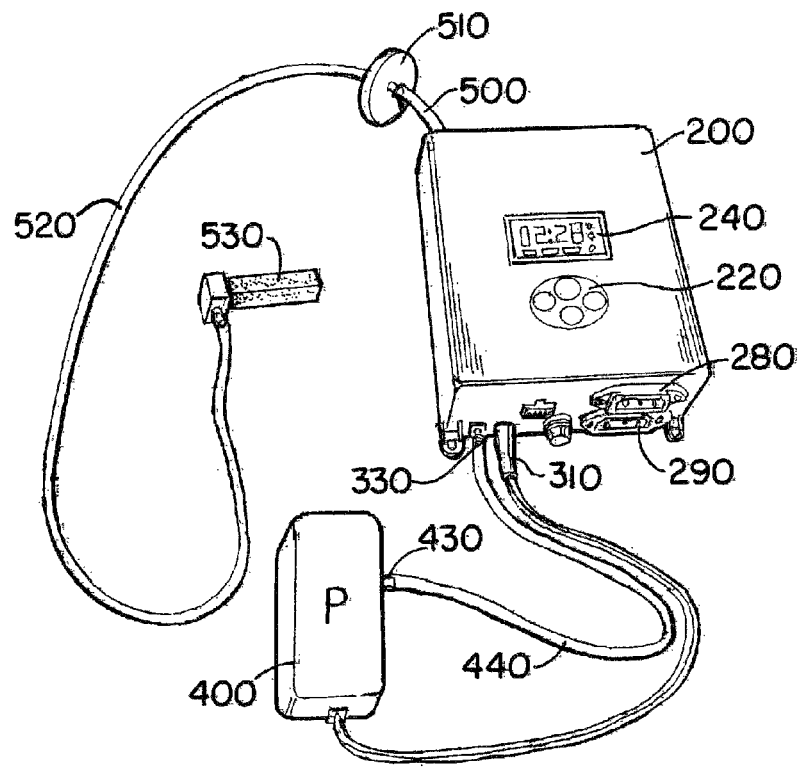
FIG. 3 is a perspective view of a programmable controller.
Figure 4:
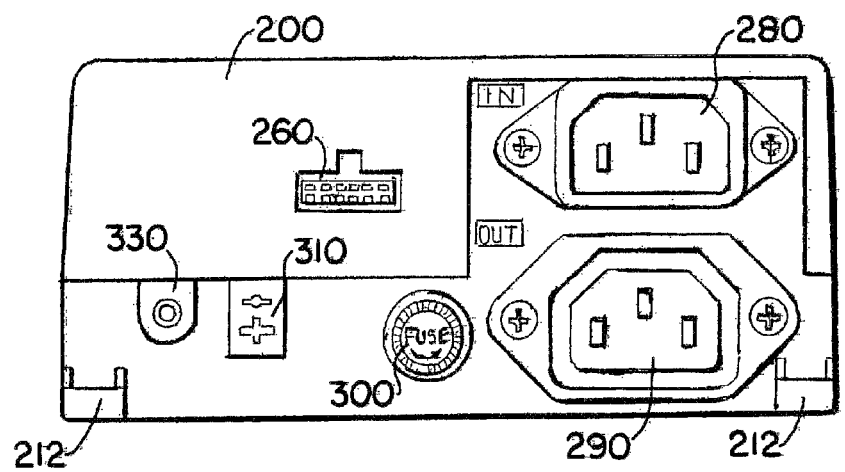
FIG. 4 is an end view of the controller of FIG. 3.
Figure 5:
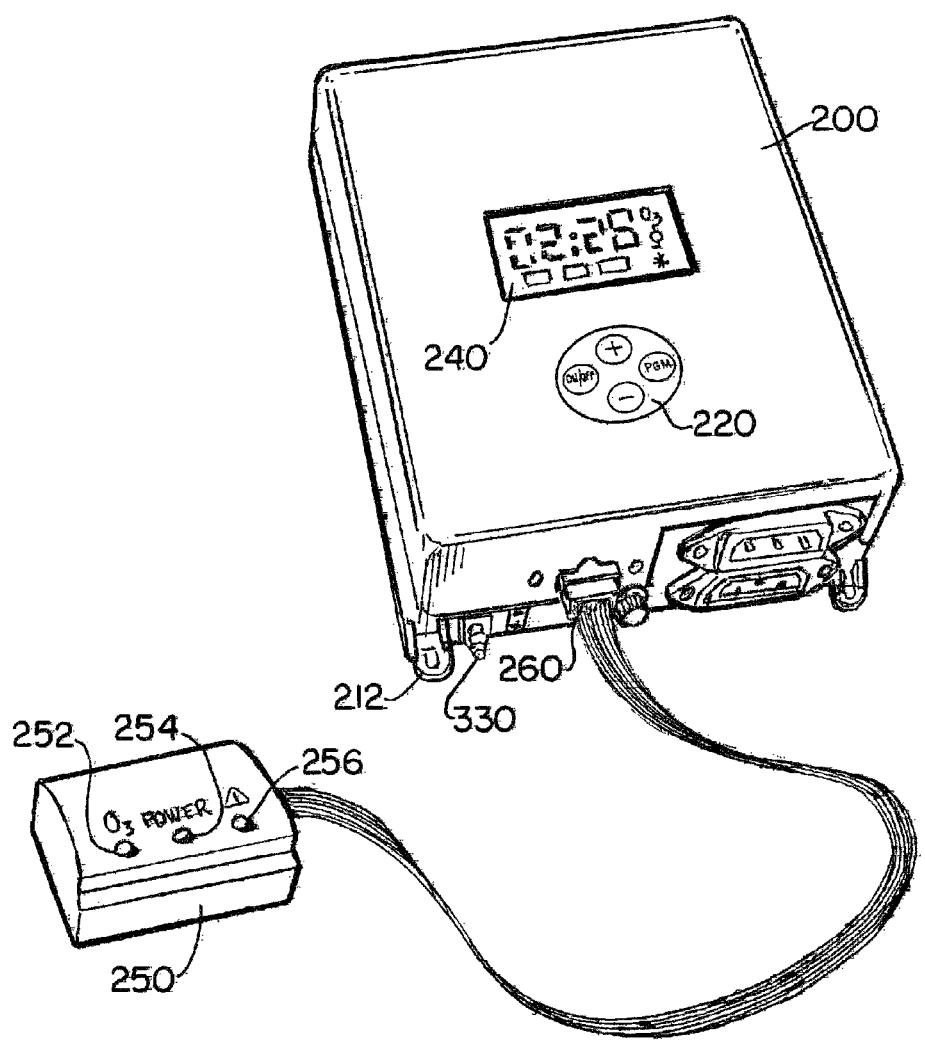
FIG. 5 is a top view of the controller of FIG. 3 with a remote display.
Figure 6:
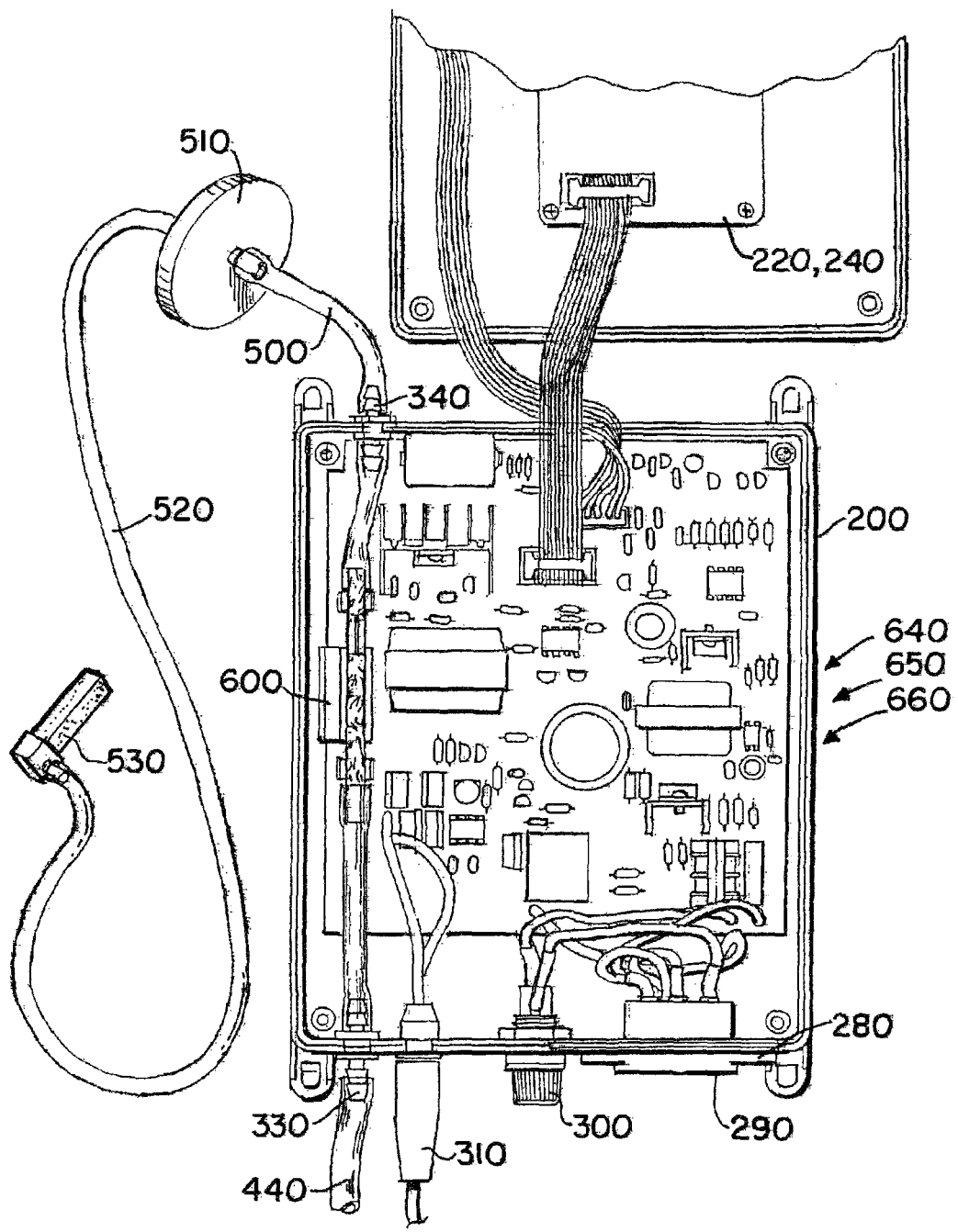
FIG. 6 is a perspective view of the controller of FIG. 3 with the casing opened.
Figures 7, 8:
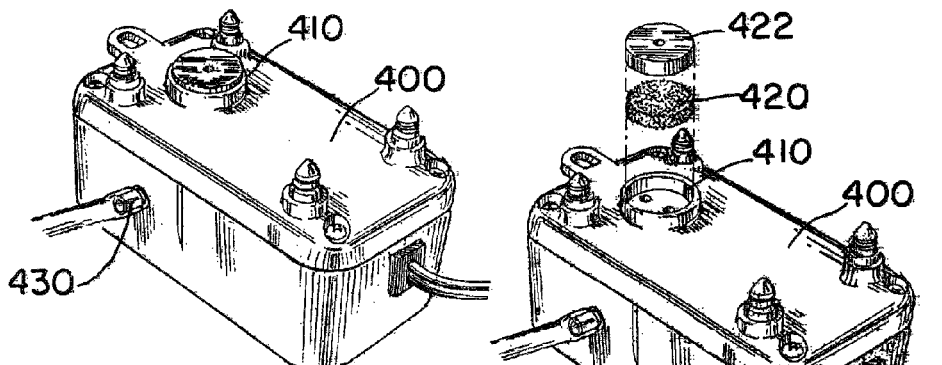
FIG. 7 is a perspective view of a pump for an ozone generator.
FIG. 8 is a perspective view of the pump in FIG. 7 with the input filter removed.
Figure 9:
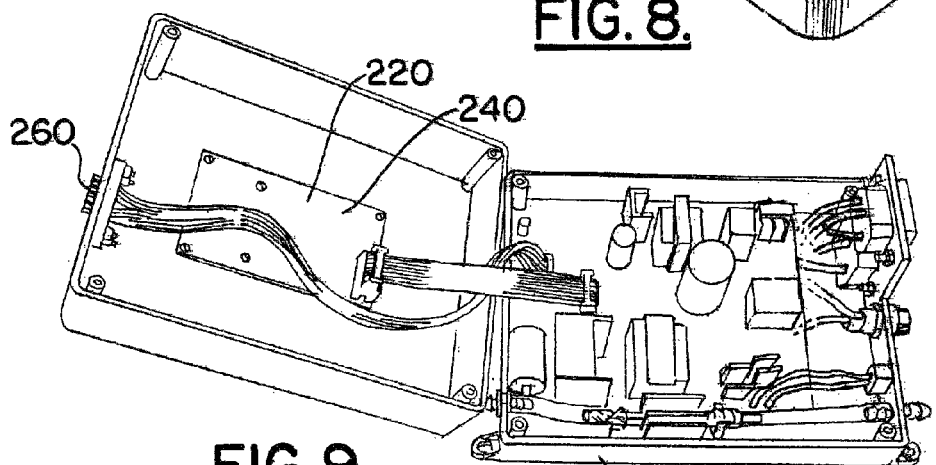
FIG. 9 is another perspective view of the controller of FIG. 3 with the casing opened.
Figure 10:
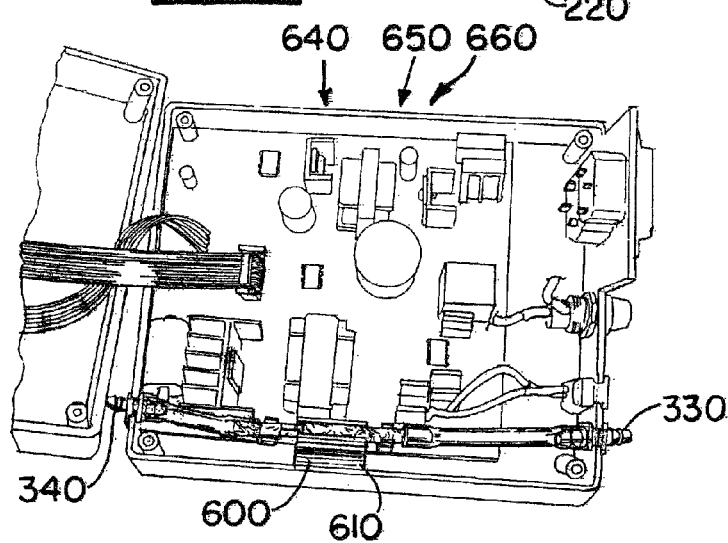
FIG. 10 is a close up view of an ozone generation component in the controller of FIG. 3.

FIG. 2 is diagram of a programmable ozone generator controller 200. FIG. 3 is a perspective view of programmable controller 200. FIG. 4 is an end view of controller 200. FIG. 5 is a top view of controller 200 with a remote display 250. FIGS. 2 and 6 are views of controller 200 with casing 210 opened in FIG. 6. FIG. 7 is a perspective view of a pump 400 for ozone generator 600. FIG. 8 is a perspective view of pump 400 with input filter 420 removed. FIG. 9 is another perspective view of controller 200 with casing 210 opened. FIG. 10 is a close up view of ozone generation component 600 which can be located in controller 200.

Generally, programmable controller 200 can comprise casing 210, display 240, programmable input 220, ozone generator 600, pump 400, and power input 280. Controller 200 can incorporate a digital computer. In one embodiment ozone generated from generator 600 can be controlled by controller 200 and can be injected into reservoir 15 through a diffuser 530. Alternatively, programmable controller 200 can include clock 248. To assist in programming ozonation, air, and compressor cycles, controller display 240 can include ozone indicator 242, gas or air flow indicator 244, and power or compressor indicator 246.

In one embodiment, a low permeability filter 510 is placed between ozone generator 600 and diffuser 530. Filter 510 is preferably of a permeability which will allow gas to flow through but resist flow of liquid (e.g., liquid water) up to a head of 10 feet of water. Alternatively, between 3 to 10 feet of water. Filter 510 can prevent liquid from forming inside of ozone generator 600 and causing a failure of generator 600. Check valves were preferred in prior embodiments, however, check valves had a tendency to stick or remain in an open position allowing liquid to pass through and accumulate in ozone generator 600. Filter 510 is preferably made from an expanded PTFE manufactured by W.L. Gore material having an average pore size of one micron. More preferably, the permeability includes a range of average pore sizes between about 0.2 microns to about 3 microns. Most preferably, the permeability includes a range of average pore sizes between about 0.5 microns to about 1.5 microns. Other materials can work where they have permeabilities preventing the formation of liquid in ozone generator 600. That is, the materials generally restrict liquid flow, but allow gaseous flow. Moisture in gas (e.g., humidity) flowing through ozone generator 600 will not cause failure of ozone generator 600.

In a preferred embodiment programmable controller 200 can control the timing and/or duration and/or amount of ozone generated. In a preferred embodiment the amount of ozone generated can be set at levels of 25%, 50%, 75%, and 100%. It is anticipated that for higher microbial loads higher percentages of ozone generation will be set. Additionally, it is anticipated that the level of ozone generated during any one time period can also be changed—for example, from higher to lower or from lower to higher or sinusoidal. In one embodiment the time ozone is generated can be programmed to occur only on certain days of the week or at certain time periods (e.g., on Wednesdays and Fridays at 1300 hours) during any calendar period.

In a preferred embodiment programmable controller 200 can control the timing and/or duration and/or amount of gas (e.g. ambient air) pumped through controller 200 (e.g., for ozone generator 600 or merely for air flow to diffuser 530). For example air can be pumped through diffuser 530 before any ozone is generated. Such activity can help to remove potentially deleterious items in the water, such as bromates. Additionally, compressor 32 on the water dispenser 10 can be cut off by the controller 200 while air is being pumped. Such an event would assist in melting an ice ring in reservoir 15 (e.g., being roughly analogous to a defrost cycle in a freezer). After the ice ring was melted, controller 200 could then send ozone though diffuser 530 killing a substantial portion of the microbes in the water. Following ozone being sent through diffuser 530, programmable controller 200 could then send air through diffuser 530 removing ozone which was previously diffused through diffuser 530. Each of these events could be controlled by the programmable controller 200 and individually programmed by a user.

In a preferred embodiment programmable controller 200 can also control power to compressor 32. Some water coolers 10 make ice inside their reservoirs 15 to make sure that customers get a very cold drink of water. Before ozonation takes place, controller 200 can shut off compressor 32 to insure that all of the ice melts either before or during the ozonation cycle. Even though frozen water can be unfriendly to bacteriological growth, this option addresses the risk that an ice ring would shield certain microbes from the ozonation process. For example, compressor 32 can be shut off one or two hours before the ozonation process begins. Alternatively, compressor 32 can be shut off only during the ozonation process. Alternatively, compressor 32 is not shut off.

In an alternative embodiment programmable controller 200 can automatically adjust for different types of electrical supplies (e.g., input voltages) for various geographical areas.

For example, different voltages are used in the United States and Europe. Controller 200 can include a voltage control circuit 620 which senses the supply voltage and adjusts same to power controller 200 and the items operably connected to controller 200, such as ozone generator 600, pump 400, and compressor 32.

In an alternative embodiment programmable controller 200 can be programmable on a calendar. For example, programmable controller 200 can be programmed on a 999 hour repeatable calendar. That is, a user can program ozonation, air pumping, and/or compressor operation individually and separately for specific start and ending periods during the 999 hour repeat cycle. Alternatively, programmable controller 200 can use a 24 hour repeat cycle and a user can program ozonation, air pumping, and/or compressor operation individually and separately for specific start and ending periods during the 24 hour cycle. Alternatively, programming ozone generation can automatically require that air be pumped during the time of ozonation regardless of whether air pumping was individually programmed to overlap with the ozonation cycle. Alternatively, more than one cycle can be programmed for ozonation, air, refrigeration in any one programming period.

In an alternative embodiment (FIG. 3) pump 400 can be separated from programmable controller 200. Pump 400 can be fluidly connected to inlet 330 of controller 200 through tube or tubing 440. Air pumped from outlet 430 will tend to be at an elevated temperature from ambient air because of the pumping action of pump 400. Ozone generator 600 will tend to generate less ozone when the incoming air is at higher temperatures. Preferably, tube 440 is long enough to allow the air to cool down before entering ozone generator 600. It has been found that seventeen or eighteen inches (43 or 46 centimeters) for tube 440 allows the air to cool sufficiently before entering ozone generator 600. Preferably, pump 400 can pump about 2 liters per minute of air.

In one embodiment, programmable controller 200 can issue a warning signal where pump 400 has not been programmed to operate at least during the entire time that ozone generator 600 has been programmed to operate. This can increase the life of ozone generator 600, as ozone generator 600 may overheat where it is operated without air flow.

FIG. 4 is an end view of controller 200. Casing 210 can include power output 290 and power input 280. Standard receptacles for output 290 and input 280 are shown. To accommodate individual receptacle types (e.g., United States versus European) different lines can be used having the appropriate plugs or receptacles. Also shown is fuse 300 which can be a standard fuse and is designed to address excessively high current or high voltage situations. Power for pump receptacle 310 is shown as being specially formatted to restrict the ability to use a pump 400 that is not properly configured with controller 200. Output 260 is shown for remote display 250.

FIG. 5 is a top view of ozone generator controller 200 with a remote display 250. Remote display 250 can include an ozone indicator 252, power indicator 254, and error indicator 256. Remote display 250 preferably can be placed at a position where a user of water dispenser 10 can readily view the display 250. In many situations this will be spaced apart from controller 200. For example, remote display 250 can be positioned on the front or side of water dispenser 10 where controller 200 is positioned at the rear or inside of water dispenser 10. Ozone indicator 252 will preferably light up when ozone is being generated by ozone generator 600. This can serve as a warning signal for a user to not dispense water while ozone indicator is lighted. Alternatively, ozone indicator 252 can light up not only when ozone is being generated, but for a set period of time after ozone has been generated, such as 5, 10, 15, 20, 25, or 30 minutes, or longer, which will allow time for ozone to be removed from water dispenser 10.

Ozone indicator 252 can be a red light to indicate a warning or to stop. Power indicator 254 can be lighted when power is being received by controller 200. Power indicator 254 can be green to indicate a good power situation. Error indicator 256 can be lighted when a failure or error situation has occurred with controller 200. Error indicator 256 can be a yellow light to indicate caution. For example, where there has been a power interruption or where the ozone generator did not come on during a cycle, error indicator 256 can be lighted.

Alternatively, ozone indicator 252 can remain lighted where a successful ozonation cycle has occurred within a set period of time, such as within the last 24 hour period. In this case ozone indicator 252 can be a green light.

In an alternative embodiment a test button can be provided to test the ozonation cycle. Where test button is activated, the ozonation cycle will be run for a set period of time, for example, thirty seconds. Alternatively, during the test ozone indicator 252 can be lighted where the ozonation cycle is being operated.

In an alternative embodiment a remote programming input unit 230 for programmable controller 200 can be provided. A remote programming input 230 could allow controller 200 to be located in the rear of water dispenser 10 while programming input 230 located on the front or one of the sides of dispenser 10.

FIG. 6 is a perspective view of controller 200 with casing 210 opened. FIG. 9 is another perspective view of ozone generator controller 200 with casing 210 opened. FIG. 10 is a close up view of ozone generation component 600 in ozone generator controller 200. Controller 200 can include a digital computer which includes control circuit 640 for ozone generation, control circuit 650 for air generation, and control circuit 660 for compressor 32 power. Controller 200 can also include control circuit 620 for voltage converter. The individual circuits are shown in the diagrams attached to this disclosure.

FIG. 7 is a perspective view of a pump 400 for ozone generator controller 200. FIG. 8 is a perspective view of pump 400 with input filter 420 removed. Pump 400 can include input 410, filter 420, filter cap 422, and output 430. Pump 400 can be spaced apart from or included in casing 210 for controller 200.

Figure 11A:
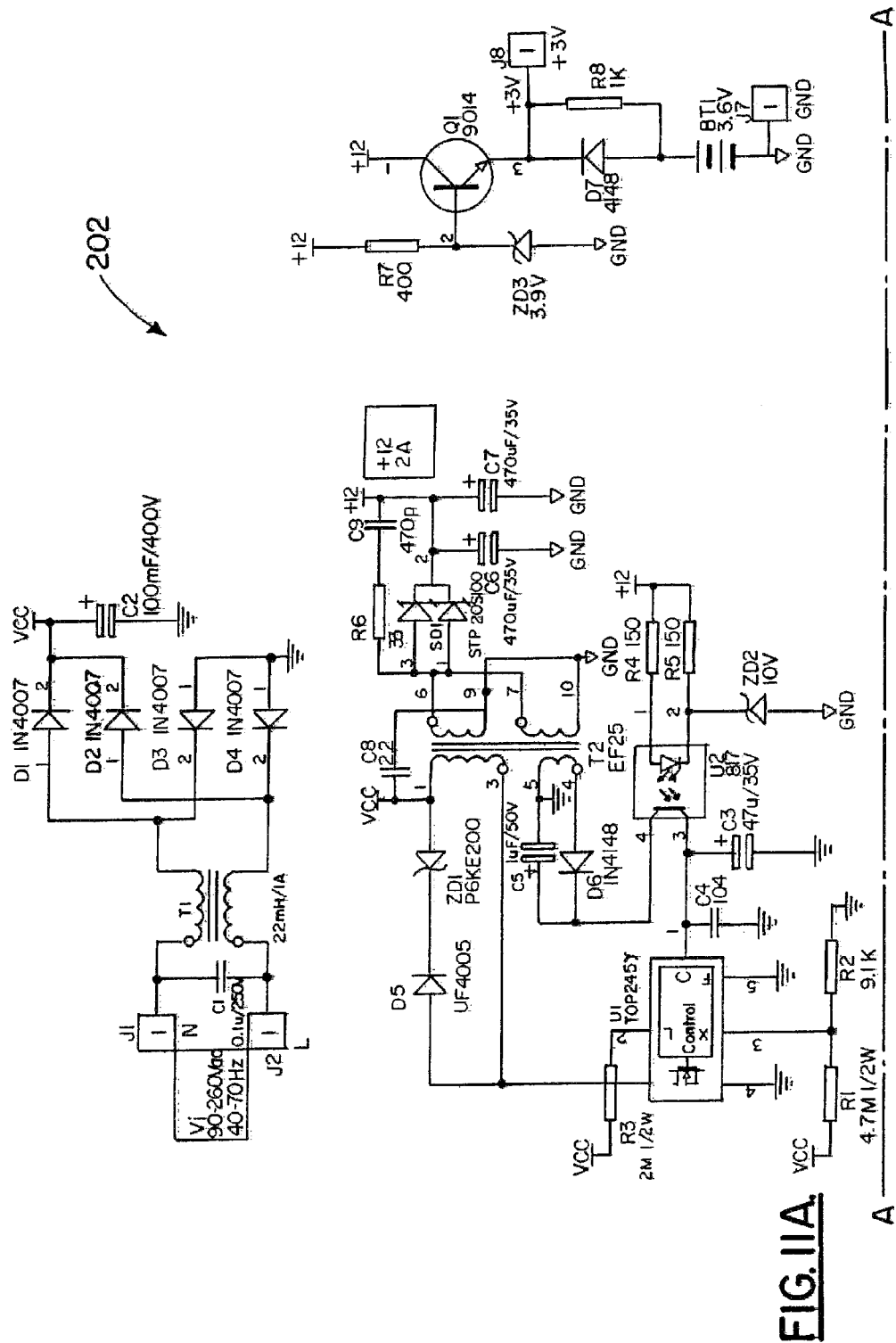
FIGS. 11A-11C are a circuit diagram for one embodiment of programmable controller.
Figure 11B:
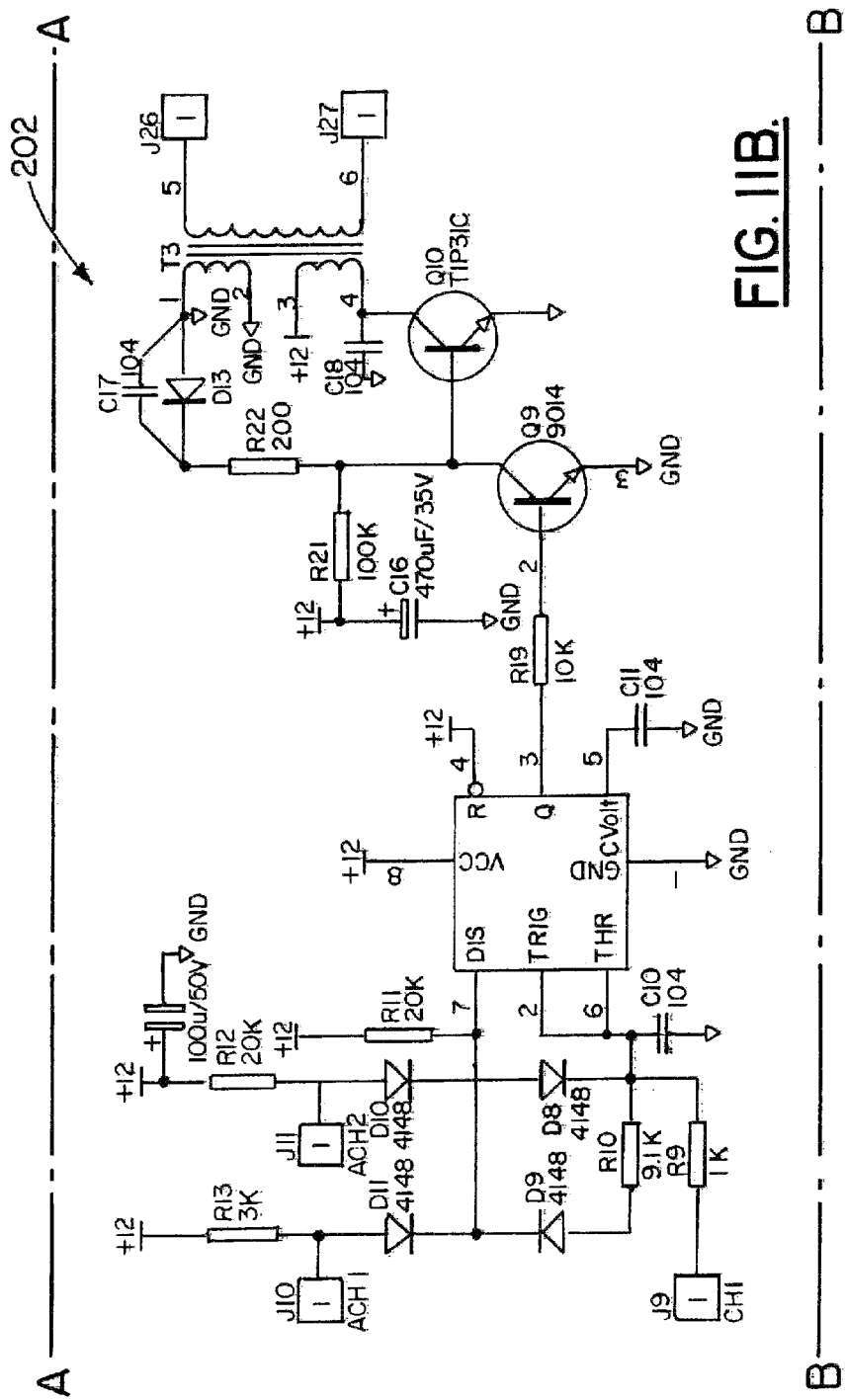
Figure 11C:
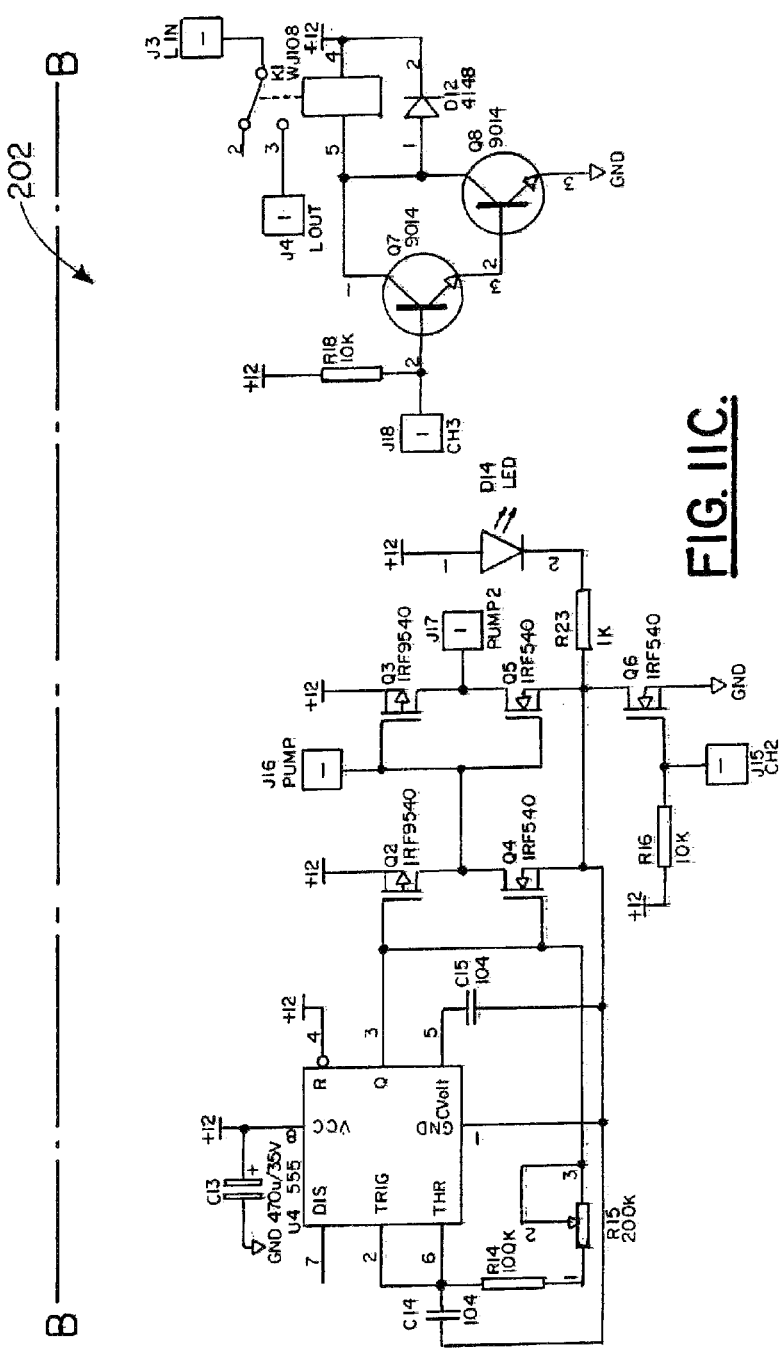
Figure 12A:
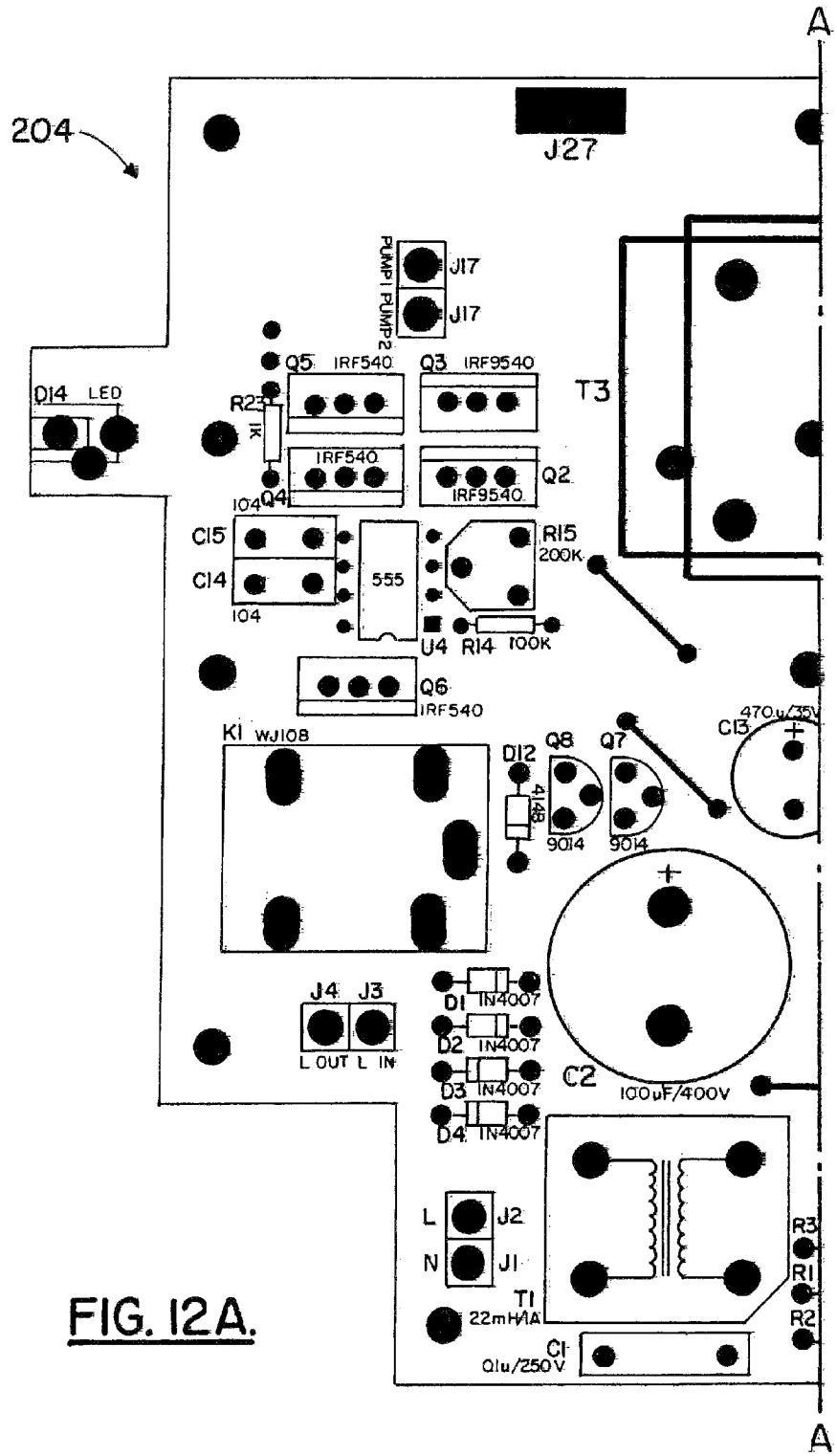
FIGS. 12A-12B are a diagram of a circuit board for the programmable controller of FIG. 11.
Figure 12B:
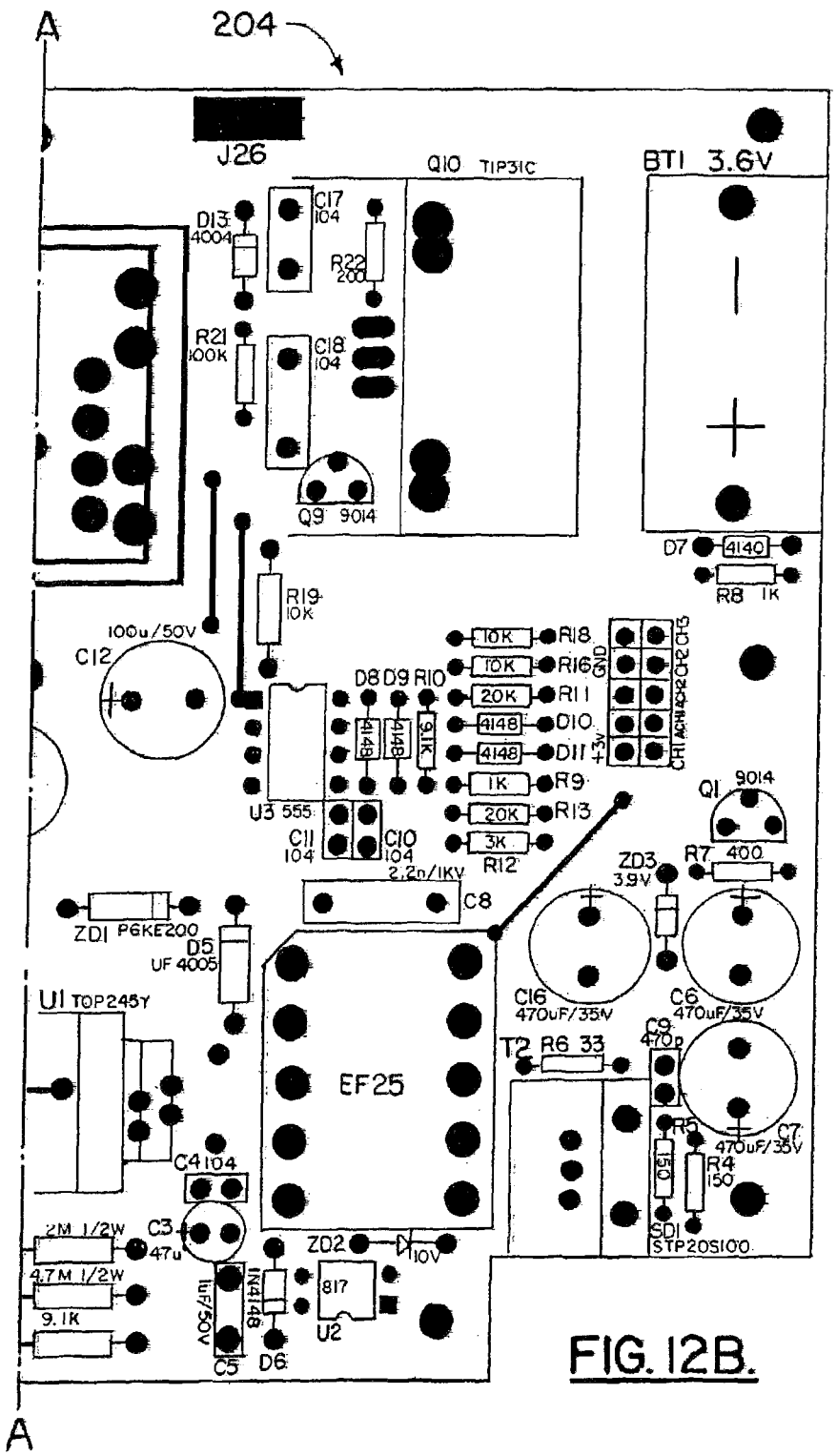
Figure 13:
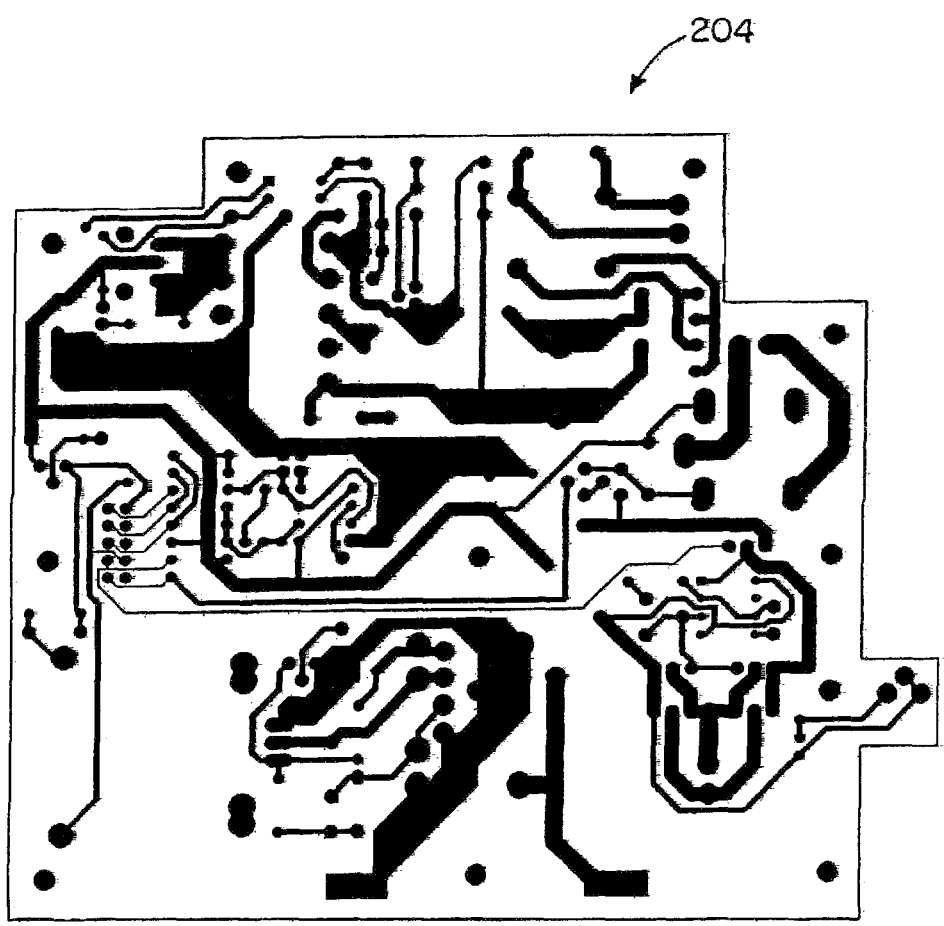
FIG. 13 is a diagram of the rear of the circuit board in FIG. 11.

FIGS. 11A, 11B, 11C are a circuit diagram 202 for one embodiment of programmable controller 200. FIGS. 12A, 12B are a diagram (coupled at match line A-A) of a circuit board 204 and various components for programmable controller 200. FIG. 13 is a diagram of the rear of the circuit board 204.

Figure 14A:
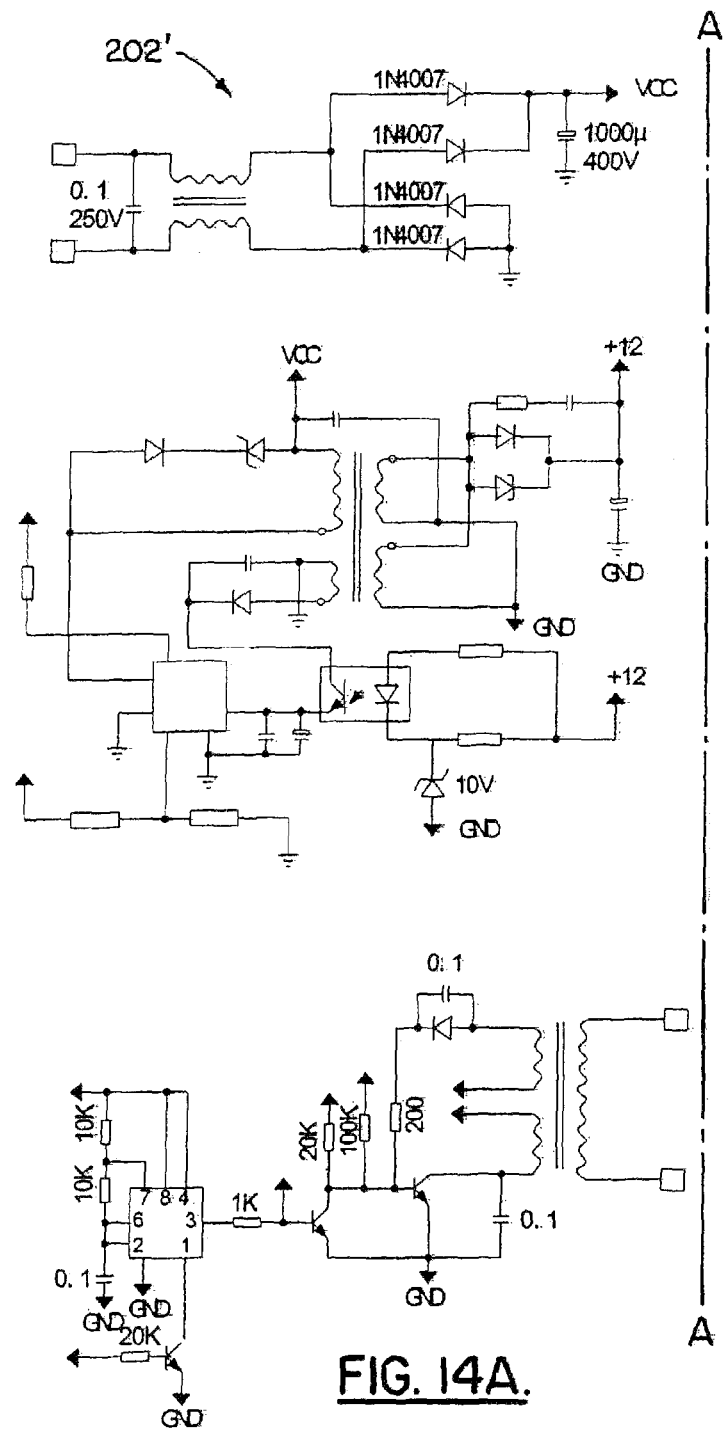
FIGS. 14A-14B are a circuit diagram for an alternative embodiment of programmable controller.
Figure 14B:
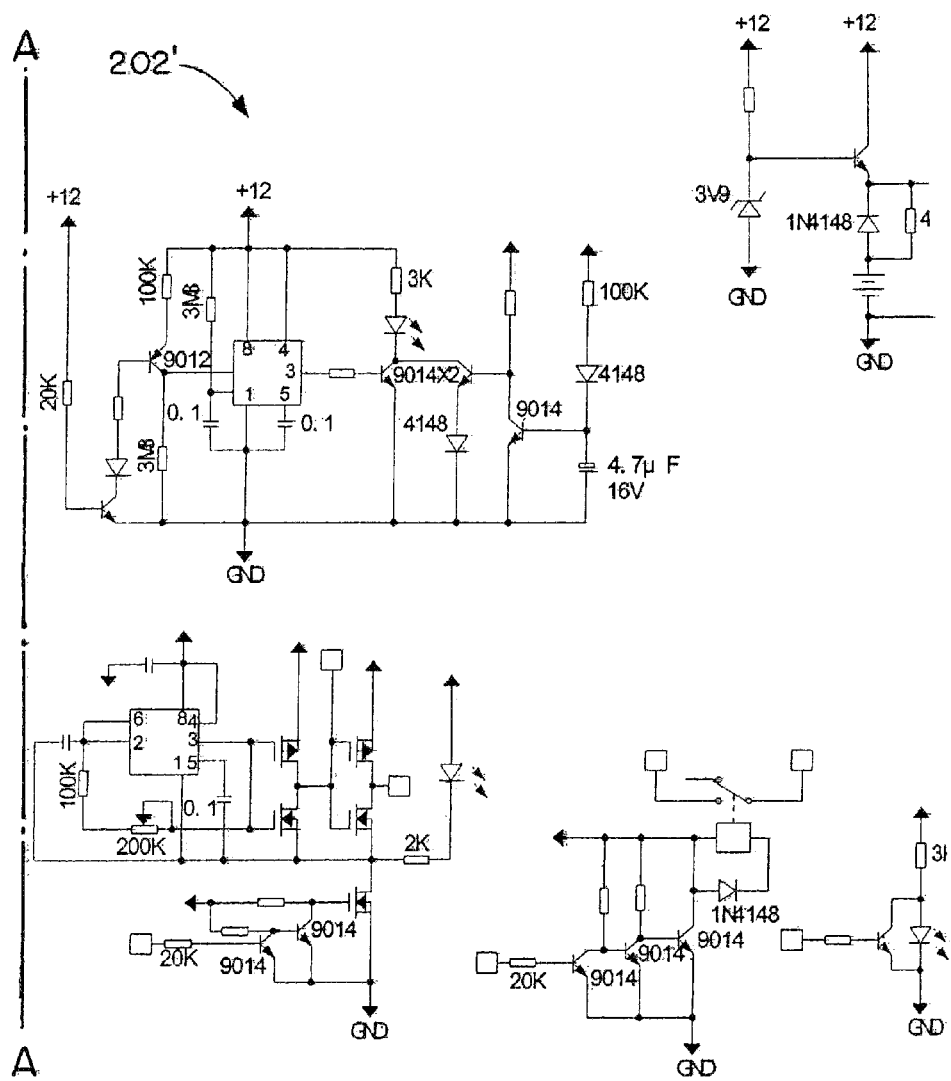
Figure 15:
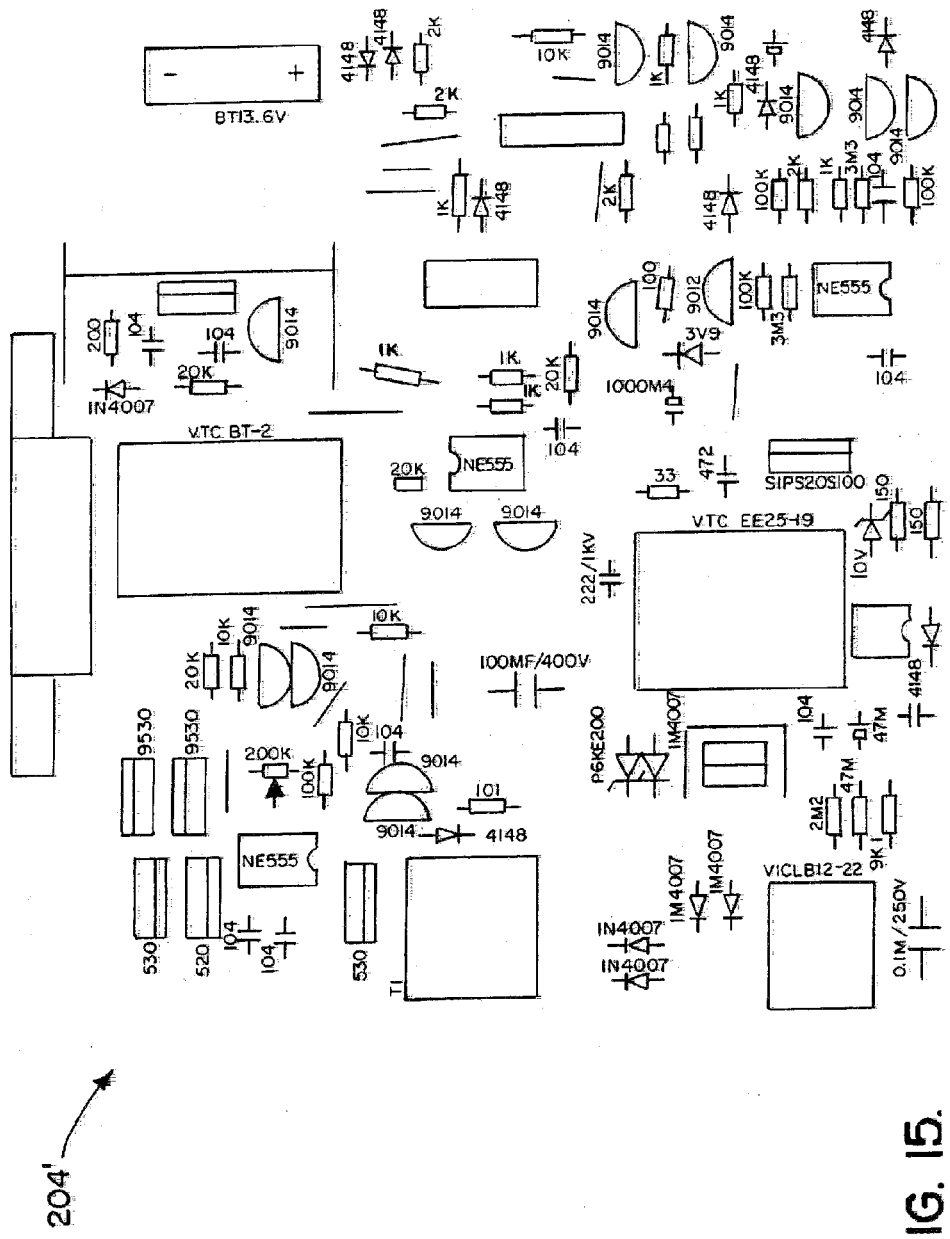
FIG. 15 is a diagram of a circuit board for the programmable controller of FIG. 14.
Figure 16:
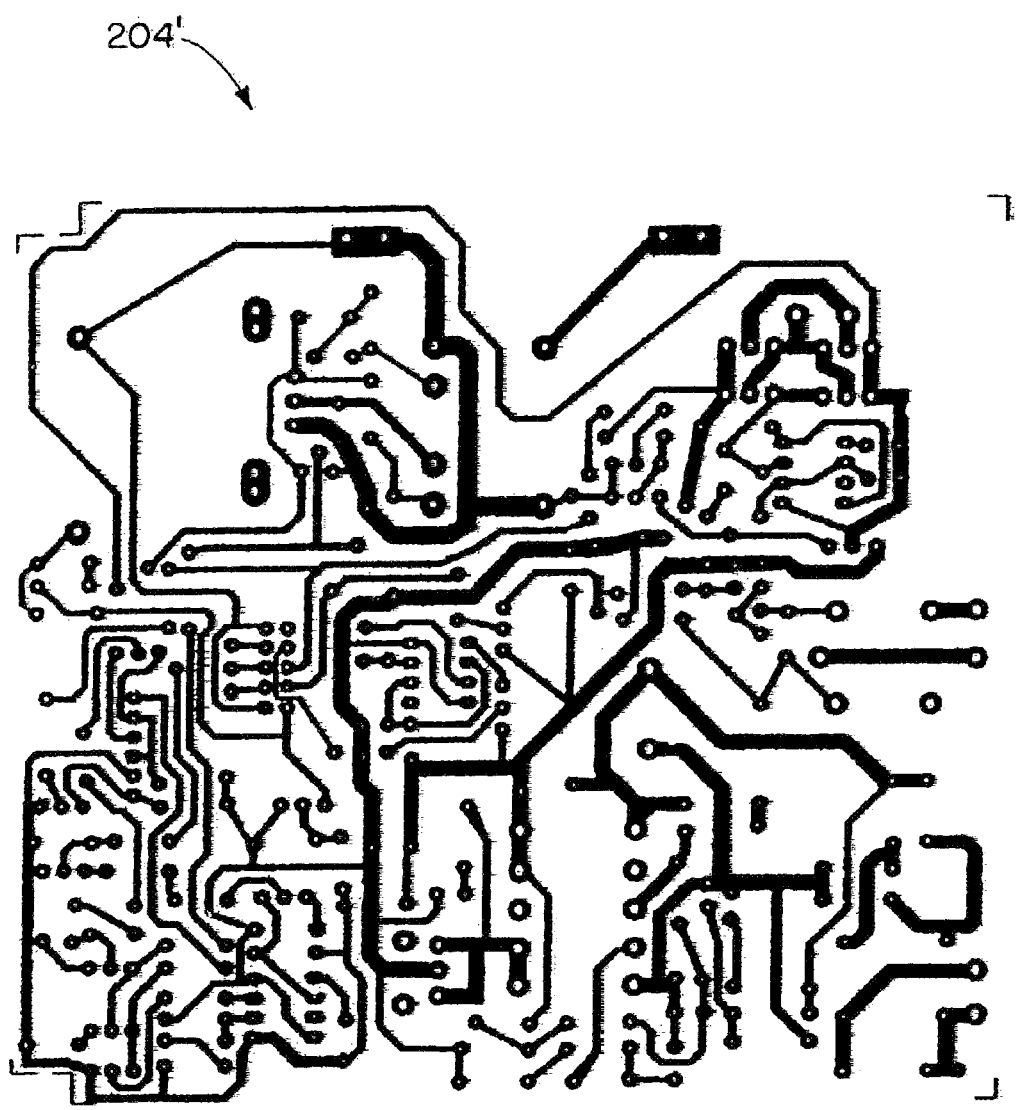
FIG. 16 is a diagram of the rear of the circuit board in FIG. 15.

FIGS. 14A-14B are a circuit diagram 202' for an alternative embodiment of programmable controller 200'. FIG. 15 is a diagram of a circuit board 204' and various components for programmable controller 200'. FIG. 16 is a diagram of the rear of circuit board 204'.

Except during programming, the apparatus controller 200' display shows you the current time (after it has been set properly). This is know at the "Clock State". During programming, it will show you exactly which function you are changing in the program by flashing that number. If a number is not entered within 30 seconds (during programming), the controller 200' will revert to the Clock State.

Figure 17A:
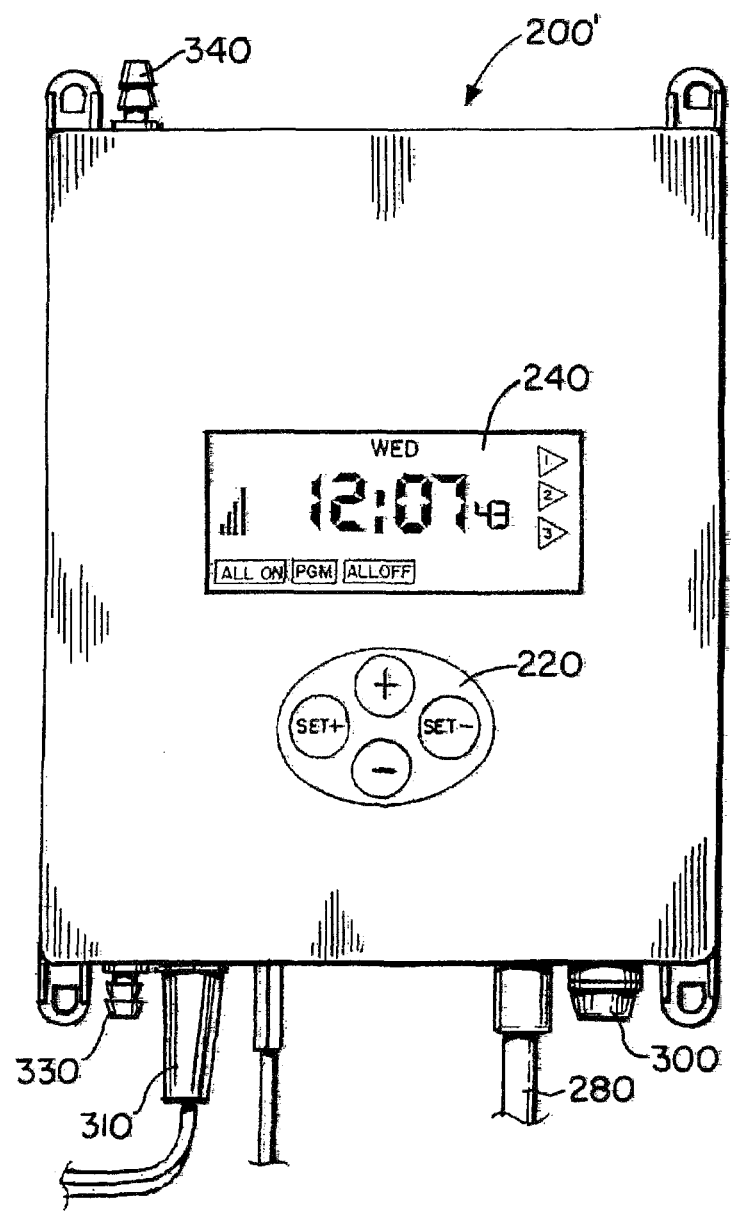
FIGS. 17A-17C are figures from operating manuals for the programmable controller.
Figure 17B:
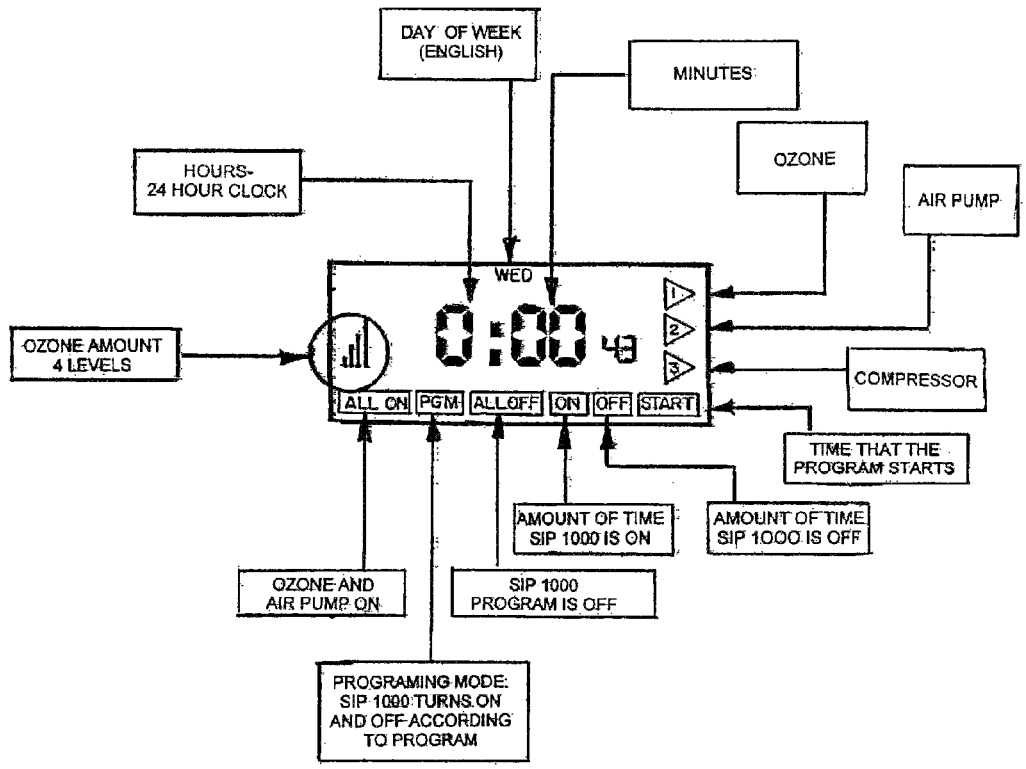

In FIG. 17B, there is shown an illustration of the display with an explanation of the various components. Please note that many the above are visible only when you are using or programming that function. For example, the "PGM" on the display only shows when actually in Program Mode.

Figure 17C:
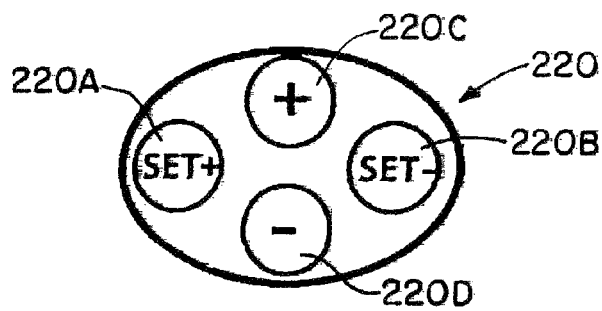
Figure 18:
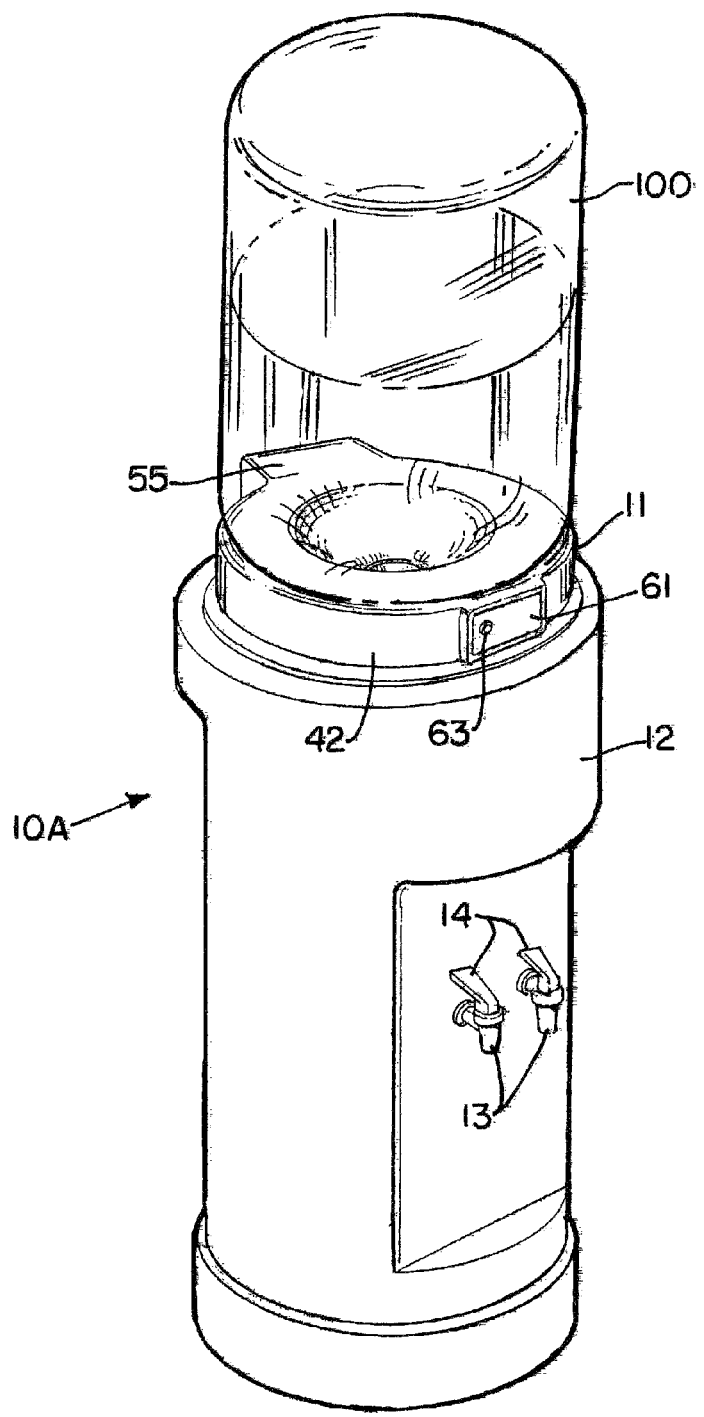
FIG. 18 is a perspective side view of a second alternate embodiment of the apparatus of the present invention.
Figure 19:
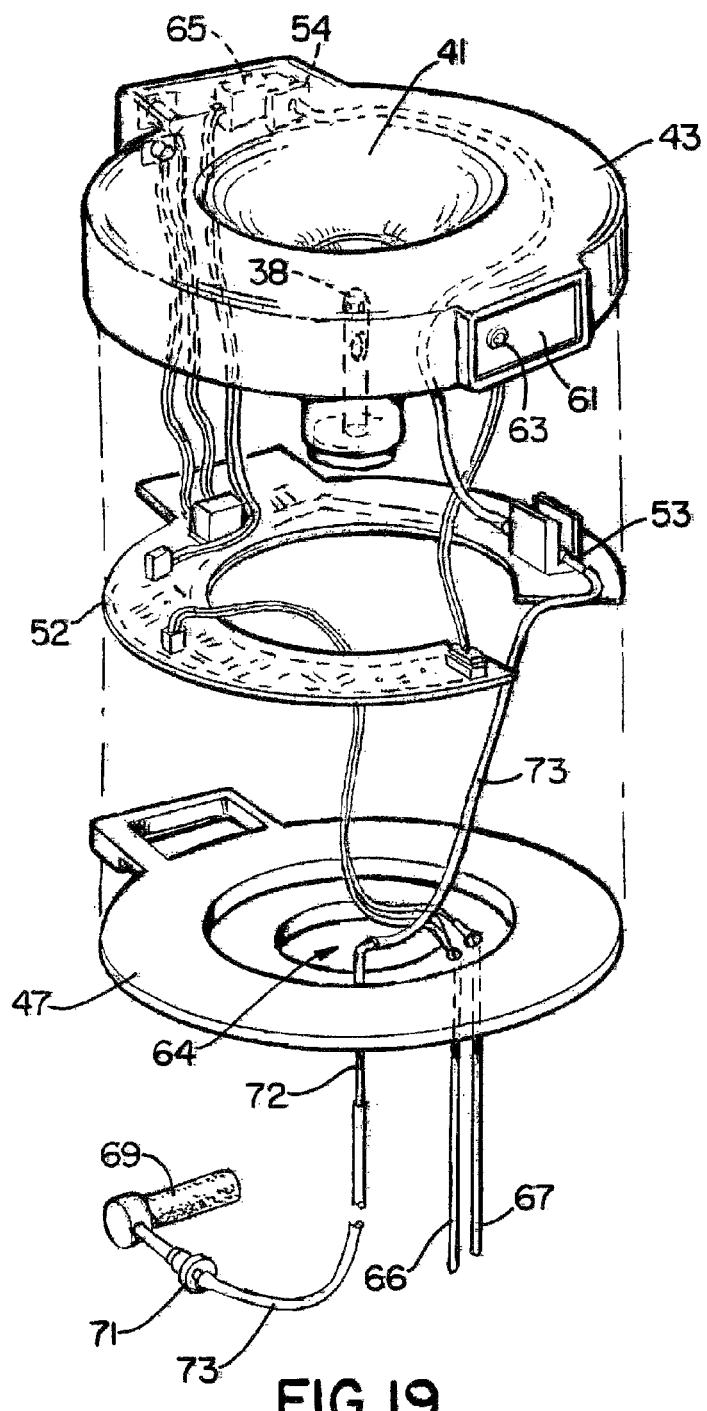
FIG. 19 is a fragmentary perspective, exploded view of the second alternate embodiment of the apparatus of the present invention.
Figure 20:
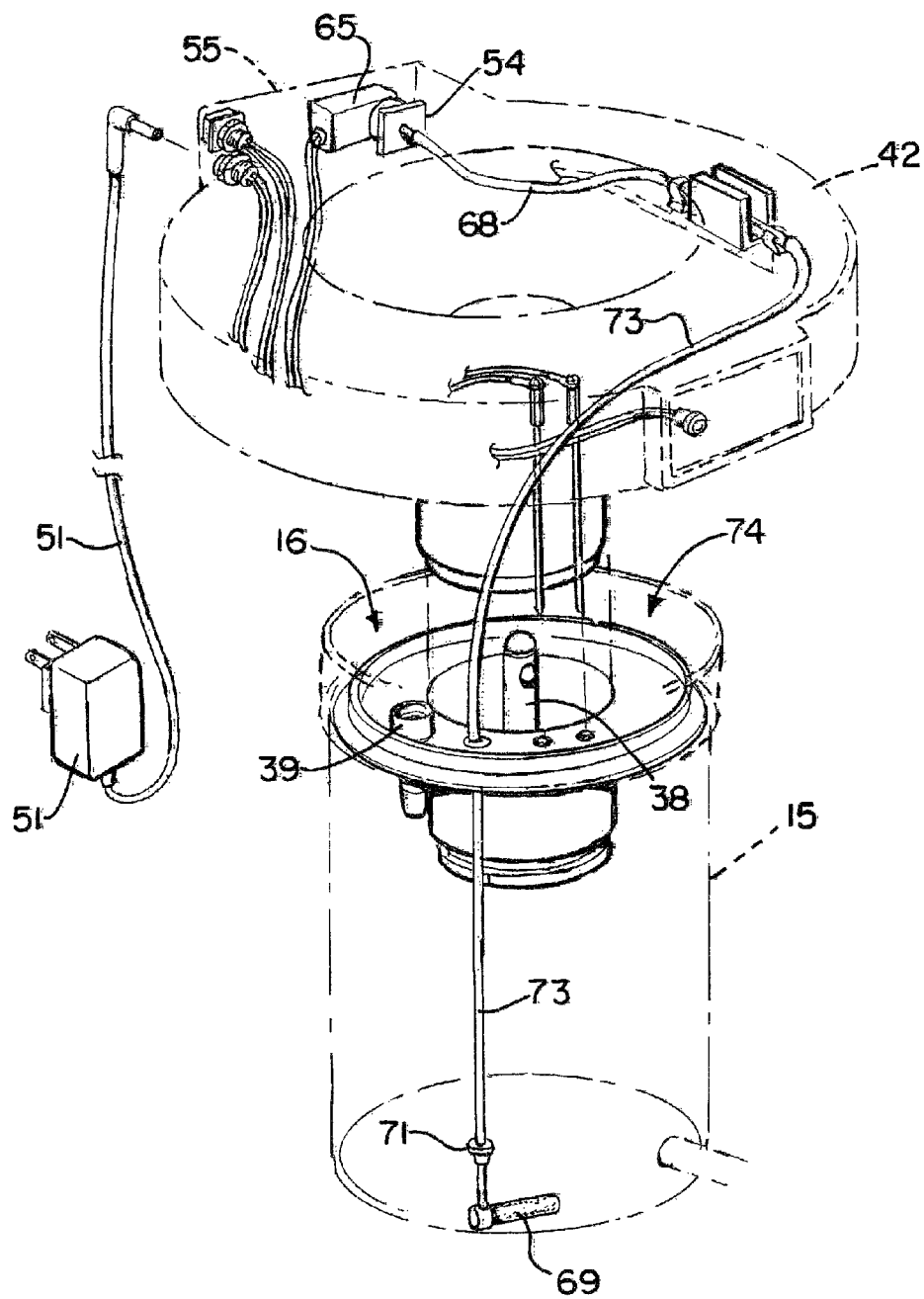
FIG. 20 is a fragmentary perspective, exploded view of the second alternate embodiment of the apparatus of the present invention.

There are programming buttons on the front panel. The Four Programming Buttons are shown in FIG. 17C. In FIG. 17C, the "SET+" button 220A enters the number and moves you forward through FUNCTIONS. The "SET−" button 220B moves backwards through FUNCTIONS. The "+" button 220C moves forward through NUMBERS when in programming mode. In the "clock state", it also will turn the module on, turn the module off and/or put the module in Program Mode. The "−" button 220D moves backwards through NUMBERS when in programming mode. In the "clock state", it also will allow you to adjust the ozone output (25%, 50%, 75% or 100%)

All clock and timer functions can be performed with these keys 220A, 220B, 220C, 220D. If an incorrect entry is made during programming, one can always go back and enter a correct number by hitting the "SET−" button 200B.

FIGS. 18-21 show a second alternate embodiment of the apparatus of the present invention, designated generally by the numeral 10A. Water dispenser 10A provides a cabinet 12 that is fitted with an anti-spill module 11. The cabinet 12 provides one or more spigots 13, each operable with a handle 14.

Cabinet 12 provides a reservoir 15 having reservoir sidewall 17, reservoir bottom wall 18 and interior 16 that communicates with a reservoir upper opening 74 to which is fitted anti-spill module 11. The anti-spill module 11 can be configured to replace an existing prior art anti-spill module or fitting such as the anti-spill module/fitting shown in U.S. Pat. No. 4,991,635, which is incorporated herein by reference. The present invention further provides an improved method of constructing an anti-spill module and an improved method of constructing a water dispenser.

The method of the present invention provides an initial step of constructing a circuit board 52 (or like medium that contains programming for sanitizing). The circuit board or medium 52 is then shipped to multiple manufacturers of water dispensers. Each manufacturer is given a specification for incorporating the circuit board/media 52 into a spill control module 11. In this fashion, the manufacturer is able to control quality.

The anti-spill module 11 of the present invention provides a hollowed housing 42 that can connect to a prior art style probe/feed tube 38 and a prior art style air filter/check valve unit 39. Probe/feed tube 38 connects to bottle 100 neck 110, removing a plug or cork so that water can flow from bottle 100 via neck 110 to reservoir 15. The disassembled module 11 is shown in the exploded view of FIG. 19 and in FIGS. 20-21. Anti-spill module 11 provides a housing 42 that includes upper section 43, housing interior 56 and lower section 47. Upper section 43 includes annular bottle support member 41. Housing 42 includes radially extending section 55 that contains air pump or blower 54 and a motor drive 65. Radially extending section 55 has an interior 57. Interior 57 can communicate with and be a part of the interior 56. On the outer surface of housing 42, there is provided a receptacle/socket 58 that can connect to a electrical supply cord 51.

A programming button 59 can be provided on the outside surface of housing 42. The programming button 59 can be used to program the apparatus 10A so that ozone is dispensed to water 75 in reservoir 15 at a selected time and for a selected time interval. The following are exemplary instructions for programming apparatus 10A using programming button 59.

Upon plugging in the apparatus 10A, an LED 63 on forward panel 61 will alternate between green and red pulses indicating a pre-programming LED sequence that it is ready to be programmed by a user. If the unit 10A is already programmed, this pre-programming LED sequence will only last for about 10 seconds. If it has not been programmed then this pre-programming LED sequence lasts indefinitely. A user presses the button 59 once within this programming window to put the apparatus 10A into "Programming Mode". A user will know the apparatus 10A has entered "Programming Mode" when the LED 63 pulses green 5 times and then remains red.

A user then depresses the button 59 once for every hour from the present time until a "Sanitization/Ozonation Cycle" is to begin. For example, if it is currently 1:00 PM and the user wishes for the "Sanitization/Ozonation Cycle" to run daily at 3:00 AM, the user would press the button 59 a total of 14 times. The LED 63 will pulse green each time the button 59 is pushed.

Figure 21:
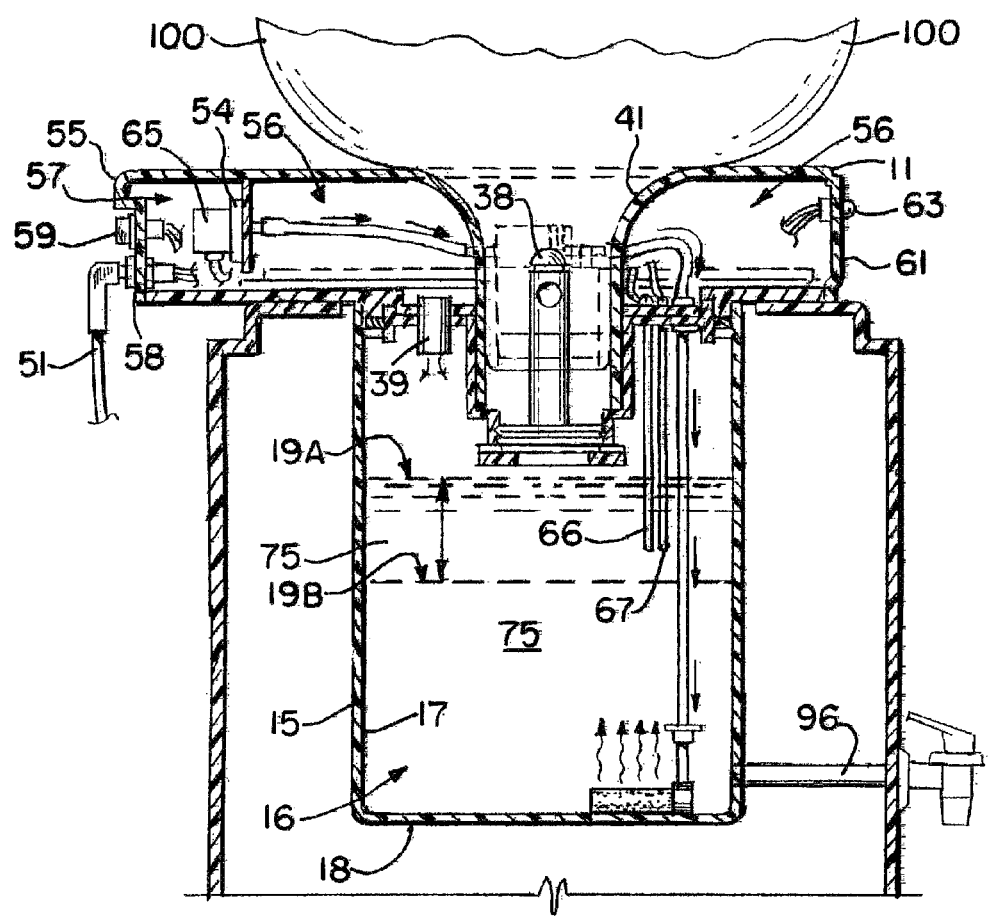
FIG. 21 is a sectional, elevation view of the second alternate embodiment of the apparatus of the present invention.

Once the user has entered in the desired start time, the user waits about 15 seconds for the apparatus 10A to exit "Programming Mode". When this occurs, the LED 63 will turn from red to green. If water is detected at the probes 66, 67, the LED 63 will stay solid. If water is not detected at the probes 66, 67, the LED 63 will flash until the probes 66, 67 are placed into reservoir 15 so that the probes 66, 67 touch water 75, for example at or below water level 19A contained in reservoir 15 as shown in FIG. 21.

The time at which the "Sanitization/Ozonation Cycle" is run can be reprogrammed by simply unplugging the apparatus 10A and then plugging it back in, and then starting again with the "Programming Mode".

If at any time a user wishes to see how many hours remain until the "Sanitization/Ozonation Cycle" will run, the user simply presses and releases the button 59. The LED 63 will pulse red once for each hour until the cycle is scheduled to run.

If a user wishes to run a "Sanitization/Ozonation Cycle" immediately ("GO" Cycle) without waiting for the scheduled cycle, the user depresses the button 59 for 20 seconds. This would typically be done once every 24 hours, and would typically not occur in the same hour as the scheduled "Sanitization/Ozonation Cycle".

The length of the "Sanitization/Ozonation Cycle" can be set using dip switches (e.g. five) on the controller board 52, located next to a battery. The apparatus 10A can be pre-programmed to run for 5 minutes of Sanitization (ozone and air flow) and 5 minutes of dissipation (i.e. air flow only, no ozone flow).

Note that if water is not detected at the metal probes 66, 67, for example at water level 19B, the "Sanitization/Ozonation Cycle" will not run. However, if water is detected in reservoir 15 by probes 66, 67, for example at water level 19A, within an hour following the beginning of when a Sanitization Cycle is scheduled to begin or when a cycle is initiated by pressing the button for 20 seconds, then the Sanitization Cycle will start as soon as water is detected in reservoir 15 and will run the entirety of its allotted time. If a Sanitization Cycle has already started when the probes detect that water is no longer present in reservoir 15, the ozone will immediately stop for the remainder of the "Sanitization/Ozonation Cycle", but the air pump 54 will run the entirety of its allotted time.

When the unit 10A is unplugged the time and program point is retained. It will continue to track real time for up to 3 weeks with no external power. At 3 weeks the unit is put into a deep sleep to conserve its battery. The time and program point are then lost.

The user can force the unit into deep sleep and back to the unprogrammed state by unplugging external power while simultaneously holding down the button 59. This is a good step to take immediately prior to shipment or storage as it saves battery life. It is also a way to allow additional "GO" cycles to be run in a 24-hour period. Note that after this action is performed, the unit 10A must be reprogrammed using button 59.

Indicator lamp 63 on panel 61 indicate whether or not power is on for the unit 10A. Indicator light 63 can indicate whether or not the unit is in the process of ozonation. For example, the indicator lamp 63 can be a green LED that indicates that it is safe to drink the water that is dispensed from either one of the spigots 13. A second indicator lamp or LED can be a red LED that indicates that ozonation is in the process of disinfecting the water and that a user should not operate the spigots 13. Alternatively, one lamp 63 can be provided that flashes "red" (ozonation in progress) or "green" (no ozonation in progress, safe to drink).

Housing 42 interior 56 can be used to contain circuit board 52, which is shaped to extend around central opening 64. It should be understood that the circuit board 52 can provide all of the functions for the apparatus 10A that are discussed in the embodiments of FIGS. 1-17.

The apparatus 10A of the present invention can thus be used to retrofit any existing water dispensing cabinet 12 with the capability of disinfecting or ozonating its water supply by simply replacing its prior art anti-spill mechanism, with the anti-spill module 11 shown in FIGS. 18-21.

Probes or contacts 66, 67 detect whether or not water is present in reservoir 15. If not, ozonation is disallowed. A third contact or probe 62 (see FIG. 22) shuts the apparatus 10 or 10A off should water 75 in reservoir 15 rise to the level of probe or contact 62 which would indicate that bottle 100 has a manufacturing defect such as a hole or crack. Flow line 68 communicates between air pump 54 ozone generator 53. Flow line 73 communicates between ozone generator 53 and diffuser 69. Fitting 72 on module 11 can be used as part of flow line 73. Flow line 73 can include check valve 71 positioned just above diffuser 69 (see FIG. 19).

Figure 22:
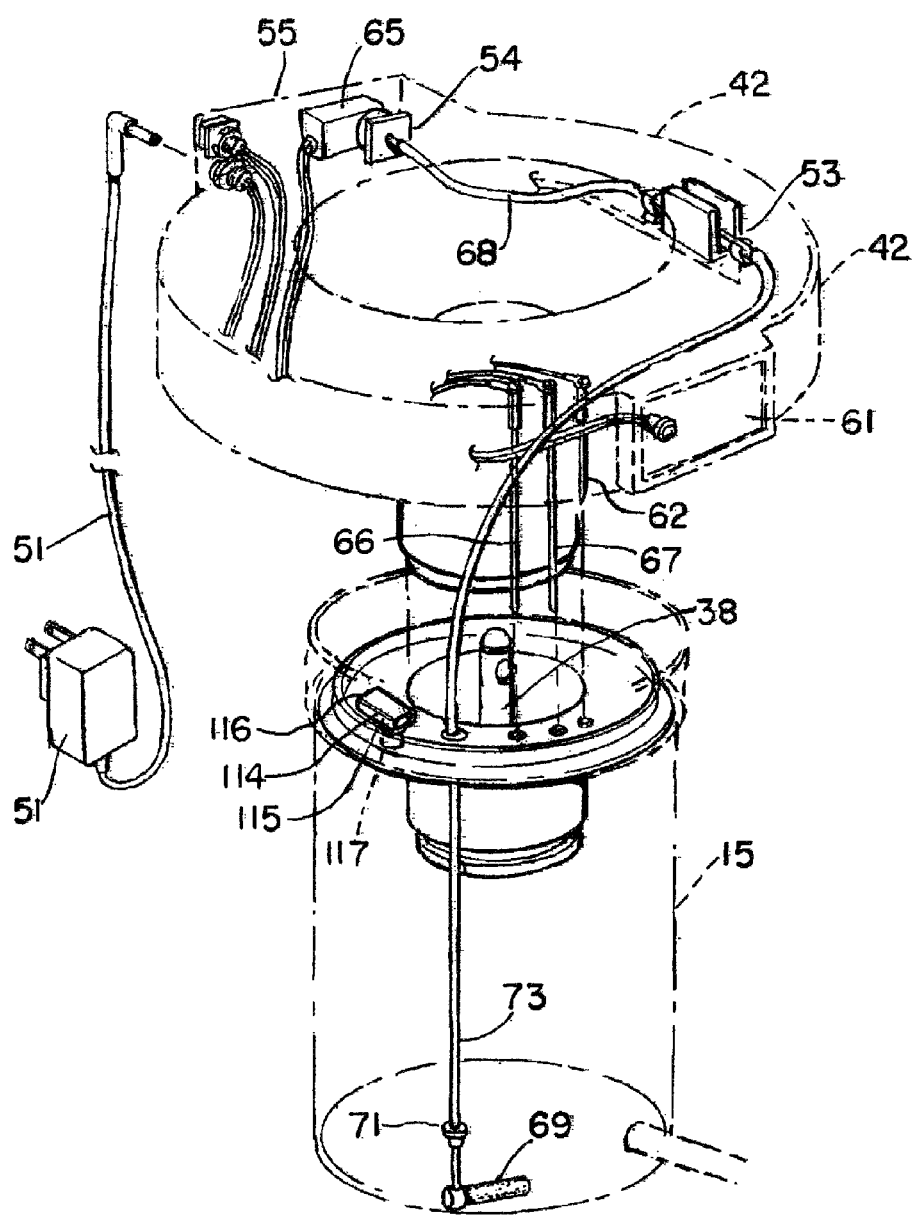
FIG. 22 is a partial sectional view of the second alternate embodiment of the apparatus of the present invention.

FIG. 22 illustrates that an ozone destruct filter and check valve assembly 114 can be placed on the probe/feed tube 38 part of housing 42. Such a filter/check valve assembly 114 can provide an activated charcoal housing section 115 that is filled with activated charcoal. Such a filter/check valve assembly 114 could provide an air outlet at 116 and an air inlet/check valve/float. The part 117 could be a combination of a float, check valve and an air inlet. When the water level in reservoir 15 rises too high, the float closes the air inlet part, disallowing water to enter the activated charcoal housing section 115. When water 75 in reservoir 15 is at a normal level, the float part drops down to allow air to enter the activated charcoal housing section 115. Air exiting reservoir 15 would typically be a mixture of air and ozone. The ozone is filtered with the activated charcoal in the housing section 115, thus disallowing the escape of ozone to the surrounding atmosphere.

Figure 23:
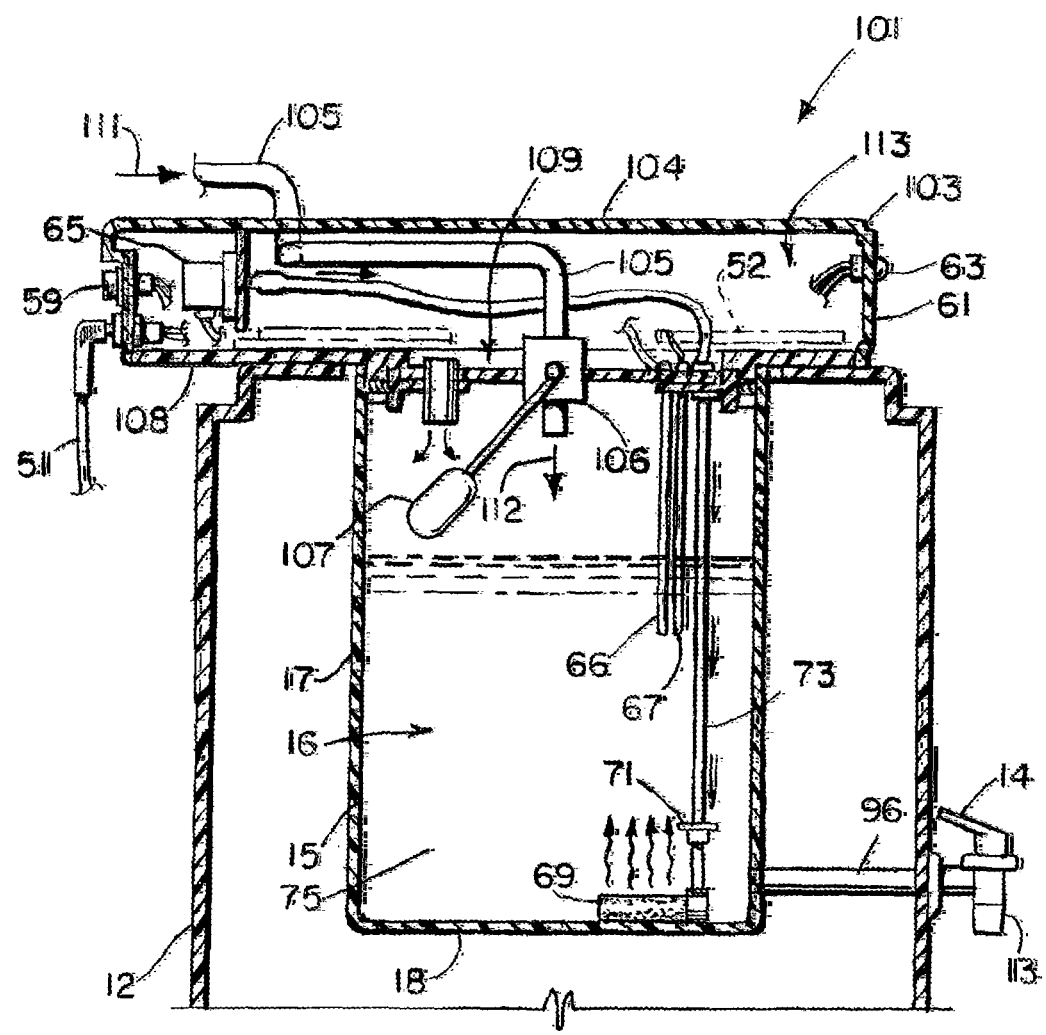
FIG. 23 is a partial sectional view of a third alternate embodiment of the apparatus of the present invention.

FIG. 23 illustrates a third alternate embodiment of the apparatus of the present invention in the form of a water dispenser/water cooler 101 that is a point of use water dispenser. The dispenser 101 could be similarly configured to the embodiment of FIGS. 18-21, providing a cabinet 12, reservoir 15, diffuser 69, motor drive 65, and an ozone generator to supply ozone to water 75 in reservoir 15 via diffuser 69. In FIG. 23, the housing sections 42, 43, 47 and probe/feed tube 38 are replaced with housing 103.

Housing 103 provides a closed top panel 104. The housing 103 having closed top panel 104 receives water from a point of use or piped in source as opposed to a bottle water source 100. In FIG. 23, influent flow line/water supply 105 is a conduit such as plastic tubing, copper tubing, or the like which receives a supply of water as indicated schematically by arrow 111. This water supply can be from the piping system of any building. The flow line 105 can be the same type of flow line (e.g. tubing) that is used to supply water to refrigerator ice makers.

Float valve 106 controls the flow of water into the interior 16 of reservoir 15 as indicated schematically by arrow 112 in FIG. 23. Float valve 106 is commercially available, providing a float 107 that elevates to close the valve 106 when the water level in reservoir 15 reaches a pre-selected maximum level.

Housing 103 includes a bottom panel 108 having an opening 109 that enables flow line 105 and valve 106 to communicate with reservoir 15 interior 16. The interior 113 of housing 103 can contain the same components for control and for generating ozone as were shown and described with respect to the embodiment of FIGS. 1-21. Thus for example, the interior 113 of housing 103 includes circuit board/controller board 52, ozone generator 53, air pump/blower 54, motor drive 65, electrical supply cord 51, programming button 59, and indicator light 63. The embodiment of FIG. 23 can also be supplied with probe/contacts 62, 66, 67 that were shown and described with respect to FIGS. 18-22.

It is preferred that components approved by United Laboratories (UL approved) be used for as many components as possible.

The following is a list of reference numerals:

| LIST OF REFERENCE NUMERALS | |
|---|---|
| (Part No.) | (Description) |
| 10 | water dispenser/water cooler |
| 10A | water dispenser |
| 11 | anti-spill module |
| 12 | cabinet |
| 13 | spigot |
| 14 | handle |
| 15 | reservoir |
| 16 | interior |
| 17 | reservoir sidewall |
| 18 | reservoir bottom wall |
| 19A | water level |
| 19B | water level |
| 20 | cabinet |
| 22 | electrical line |
| 24 | plug |
| 30 | lower end portion |
| 32 | compressor |
| 34 | cooling coils |
| 35 | flow line |
| 36 | flow line |
| 37 | heat exchanger |
| 38 | probe/feed tube |
| 39 | filter/check valve |
| 40 | upper end portion |
| 41 | annular bottle support member |
| 42 | housing |
| 43 | upper section |
| 44 | flow inlet |
| 45 | filter |
| 46 | tapered entry |
| 47 | lower section |
| 48 | valving member |
| 49 | filter element |
| 50 | cover |
| 51 | electrical supply cord |
| 52 | circuit board/controller board |
| 53 | ozone generator |
| 54 | air pump/blower |
| 55 | radially extending section |
| 56 | interior |
| 57 | interior |
| 58 | receptacle/socket |
| 59 | programming button |

-continued

LIST OF REFERENCE NUMERALS

| (Part No.) | (Description) |
|---|---|
| 60 | opening |
| 61 | forward panel |
| 62 | probe |
| 63 | indicator light (LED) |
| 64 | central opening |
| 65 | motor drive |
| 66 | probe/contact |
| 67 | probe/contact |
| 68 | flow line |
| 69 | diffuser |
| 70 | annular flange |
| 71 | check valve |
| 72 | fitting |
| 73 | flow line |
| 74 | upper opening |
| 75 | water |
| 80 | gasket |
| 90 | spigot |
| 92 | spigot |
| 96 | flow line |
| 100 | bottle |
| 101 | water dispenser/water cooler (point of use) |
| 102 | water level in bottle |
| 103 | housing |
| 104 | top panel |
| 105 | influent flow line/water supply |
| 106 | float valve |
| 107 | float |
| 108 | bottom panel |
| 109 | opening |
| 110 | bottle neck |
| 111 | arrow |
| 112 | arrow |
| 113 | interior |
| 114 | filter/check valve assembly |
| 115 | activated charcoal housing section |
| 116 | air outlet |
| 117 | air inlet/check valve/float |
| 200 | controller |
| 200' | controller |
| 202 | circuit diagram |
| 202' | circuit diagram |
| 204 | circuit board |
| 204' | circuit board |
| 210 | casing |
| 212 | mounting bracket |
| 220 | programmable input |
| 220A | set button |
| 220B | set button |
| 220C | set button |
| 220D | set button |
| 230 | remote programmable input |
| 240 | display |
| 242 | ozone indicator |
| 244 | gas flow indicator |
| 246 | compressor indicator |
| 248 | clock |
| 250 | remote display |
| 252 | ozone indicator |
| 254 | power indicator |
| 256 | error indicator |
| 260 | output for remote display |
| 270 | support connectors |
| 280 | power input |
| 282 | plug |
| 290 | power output |
| 300 | electrical fuse |
| 310 | power for pump |
| 330 | gas input/inlet |
| 340 | gas output |
| 400 | pump |
| 410 | input for pump |
| 420 | filter |
| 422 | cap |
| 430 | output for pump |

-continued

LIST OF REFERENCE NUMERALS

| (Part No.) | (Description) |
|---|---|
| 440 | tube/tubing |
| 500 | first output tubing |
| 510 | low permeability filter |
| 520 | second output tubing |
| 530 | diffuser |
| 600 | ozone generator |
| 610 | heat sink for ozone generator |
| 620 | control circuit for universal voltage converter |
| 630 | backup battery |
| 640 | control circuit for ozone generation |
| 650 | control circuit for air generation |
| 660 | control circuit for compressor power |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A water dispenser, comprising:
   a) a cabinet having upper and lower end portions and an interior;
   b) reservoir contained within the cabinet, the reservoir being capable of holding water;
   c) an anti-spill annular housing
      that is attached to the cabinet above the reservoir,
      the anti-spill annular housing having
         a central opening surrounded by a bottle support surface
            that is configured to support an inverted water supply bottle having a neck,
         a separating wall that separates the interior from the water contained in the reservoir; and
      a probe,
         the probe extending upwardly and
         configured to connect to a water supply bottle at the bottle opening;
   d) at least one spigot in fluid communication with the reservoir for dispensing water;
   e) a diffuser contained within the reservoir for emitting bubbles into the reservoir; characterized by:
   f) an ozone generator
      contained within said annular housing and
      being operably connected to the diffuser;
   g) a pump that is in fluid communication with the ozone generator and the diffuser so that the pump can transmit ozone from the generator to the diffuser;
   h) a controller operably connected to the ozone generator;
   i) the controller being programmable regarding the timing and duration of ozone generated by the ozone generator and sent to the diffuser; and
   j) at least one water detection probe operably connected to the controller,
the at least one water detection probe
extending downward through the separating wall
into the reservoir to detect a water level within the reservoir,
wherein the at least one water detection probe
communicates with the controller
to prevent operation of the ozone generator.

2. The water dispenser of claim 1, wherein the controller includes an input for the pump which allows programming for the operation of the pump regarding the timing and duration of air to be sent to the diffuser from the pump.

3. The water dispenser of claim 1, wherein the controller is programmable regarding the amount of ozone generated, the amounts being chosen from between about 25 to about 100 percent ozone generation.

4. The water dispenser of claim 2, wherein the controller is programmed to have air pumped through the diffuser for a set period of time before ozone is generated.

5. The water dispenser of claim 2, wherein the controller is programmed to have air pumped through the diffuser for a set period of time before ozone is sent through the diffuser and a set period of time after ozone is generated.

6. The water dispenser of claim 2, wherein the controller is programmed to have air pumped through the diffuser for a set period of time after ozone is generated.

7. The apparatus of claim 1, wherein the apparatus includes at least one water detection probe that is a low level water detection probe (66, 67) and at least a second water detection probe that is a high level water detection probe (62) each of these water detection probes operably connected to the controller (52), the at least one and the at least second water detection probes (62, 66, 67) extending downward through the separating wall into the reservoir (15) to detect a water level within the reservoir.

8. The water dispenser of claim 7, further comprising a refrigeration system that enables cooling of water in the reservoir and wherein the refrigeration system is shut off a selected time interval before ozone is generated.

* * * * *